United States Patent [19]

Houston

[11] 4,305,599

[45] Dec. 15, 1981

[54] TRANSMISSION FOR A WHEELED VEHICLE

[76] Inventor: Jack E. Houston, 14 County Ct., Gaithersburg, Md. 20760

[21] Appl. No.: 107,917

[22] Filed: Dec. 28, 1979

[51] Int. Cl.³ .............................................. B62M 1/04
[52] U.S. Cl. ................................... 280/212; 74/125.5; 185/39; 280/215
[58] Field of Search ............... 280/215, 214, 212, 223; 185/39, 40 H; 74/125.5, 25; 192/33 R, 40

[56] References Cited

U.S. PATENT DOCUMENTS

| | | | |
|---|---|---|---|
| 1,572,051 | 2/1926 | Sullivan | 280/215 |
| 2,914,956 | 12/1959 | Maclay | 74/125.5 |
| 3,768,835 | 10/1973 | Lee | 280/215 |
| 3,894,615 | 7/1975 | Lew | 74/25 |

*Primary Examiner*—Joseph F. Peters, Jr.
*Assistant Examiner*—Randall A. Schrecengost
*Attorney, Agent, or Firm*—Burns, Doane, Swecker & Mathis

[57] ABSTRACT

A transmission apparatus for a wheeled vehicle is disclosed. The wheeled vehicle includes a rotatable driving member, to which power is delivered by rotating the driving member in a first direction, and a ground engaging wheel. The transmission apparatus includes a cylindrical spring which encircles an axle of the ground engaging wheel. A first end of the cylindrical spring is connected to the axle, and a second end is connected to a one-way clutch mechanism which periodically engages an inner surface of a hub of the ground engaging wheel to periodically deliver energy stored in the spring to the wheel. An engaging mechanism, which is mounted on the axle adjacent to the clutch mechanism, is capable of periodically engaging the clutch mechanism. A reversing mechanism, which links the engaging mechanism to the driving member, urges the engaging mechanism to periodically rotate the clutch mechanism in a second direction opposed to the first direction of rotation of the driving member, in order to periodically tension the spring and to periodically transfer energy to the spring.

34 Claims, 29 Drawing Figures

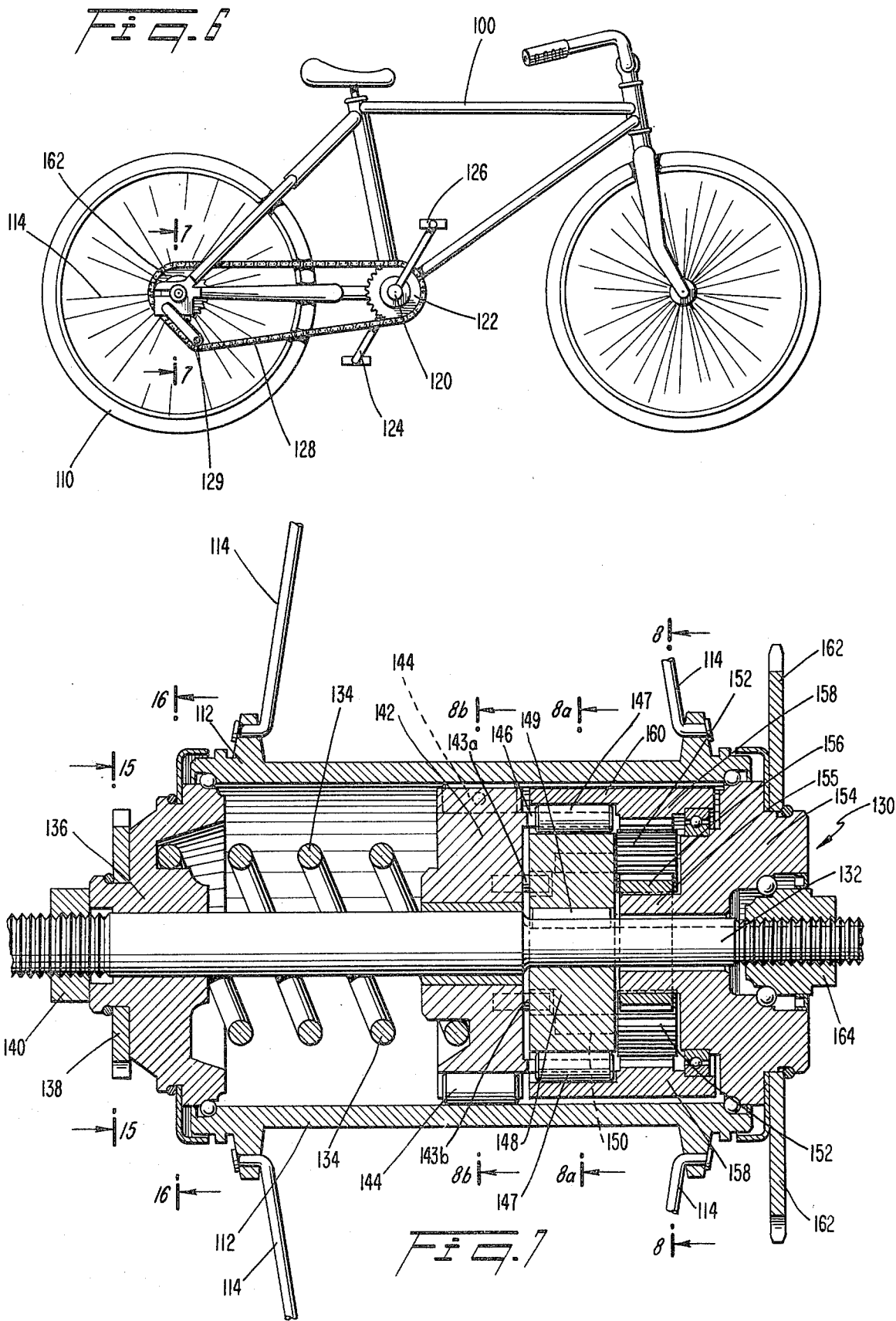

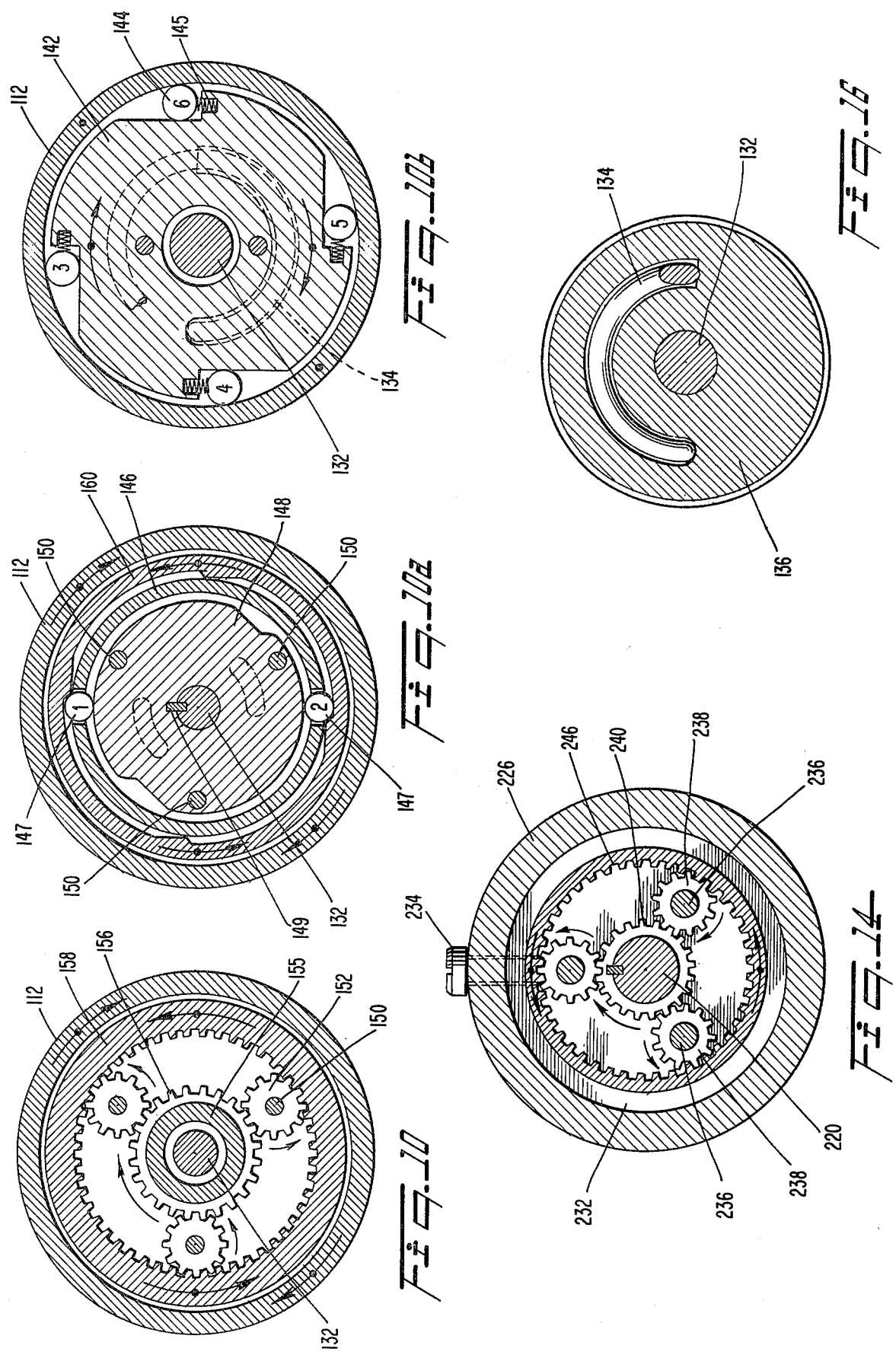

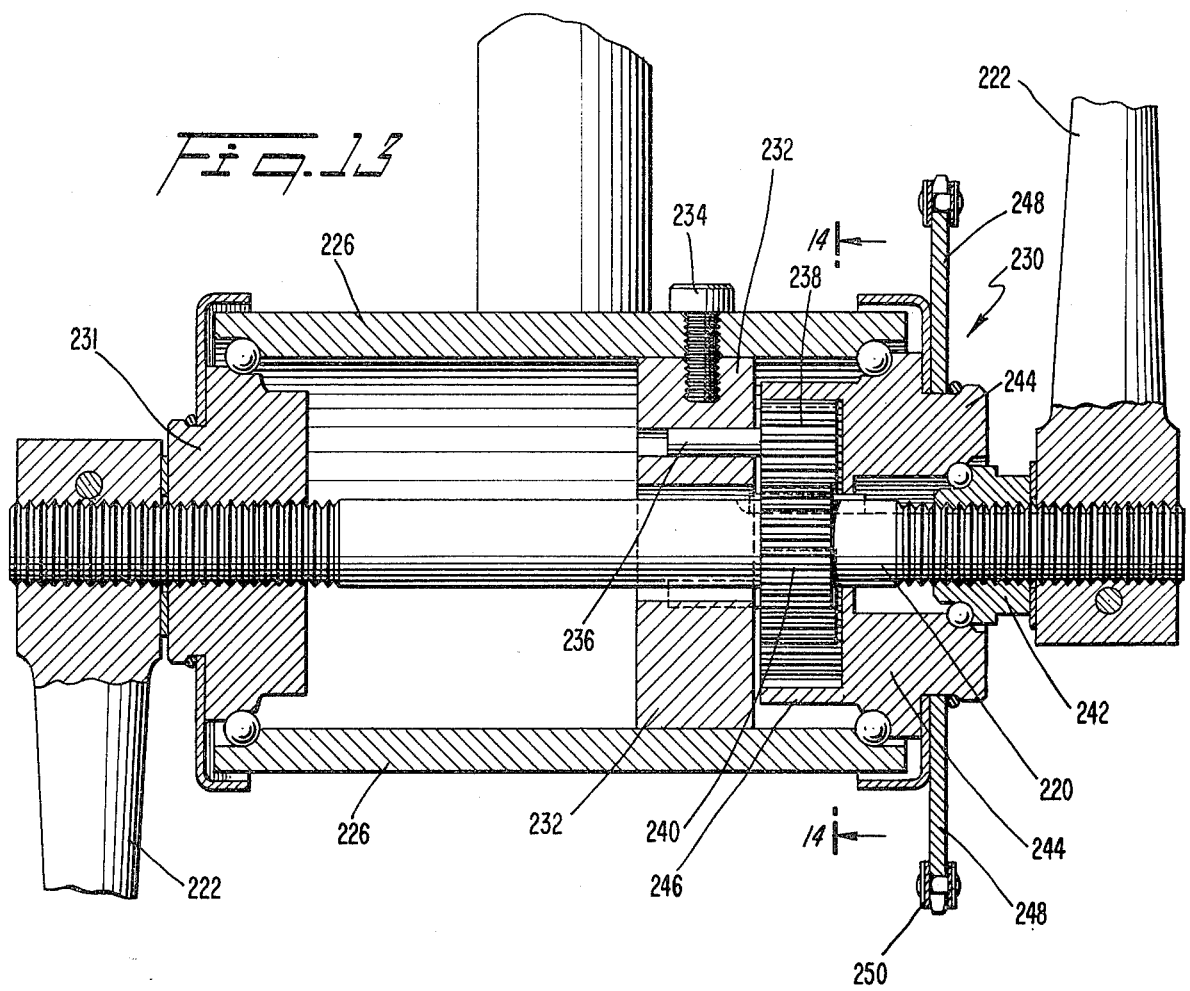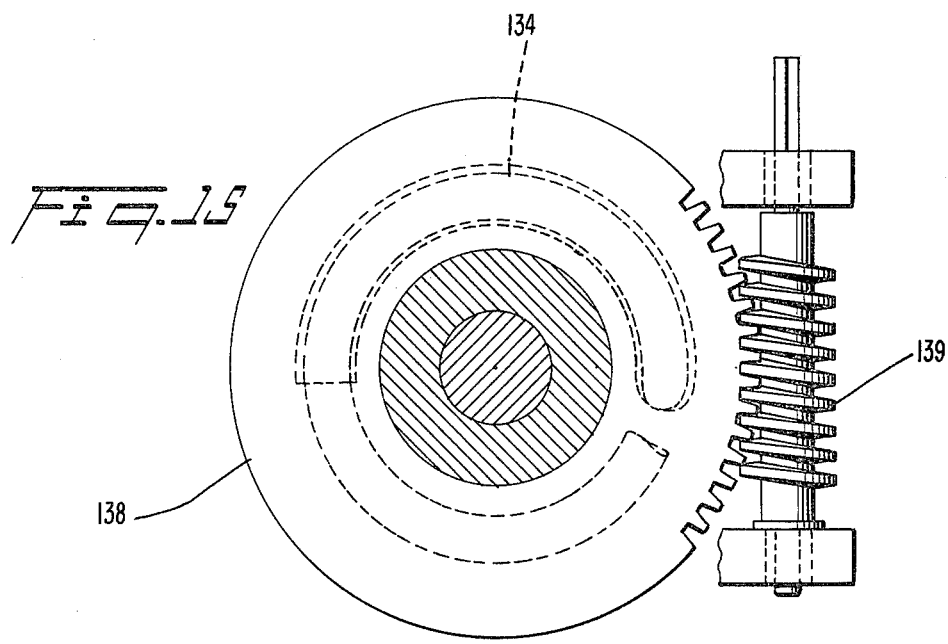

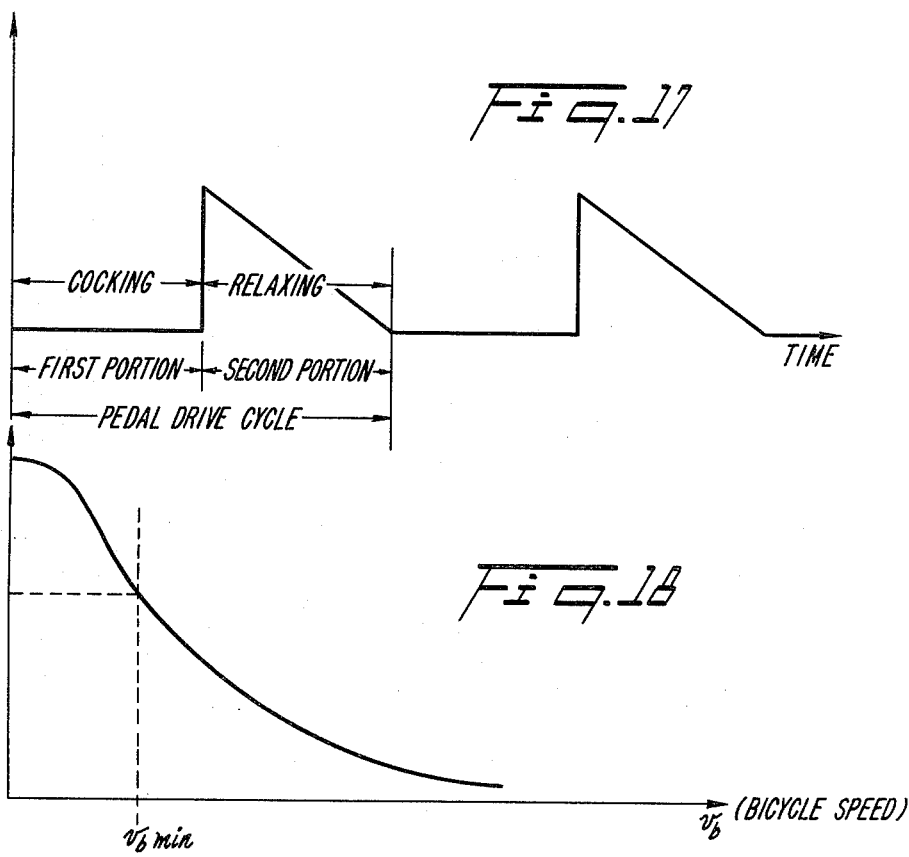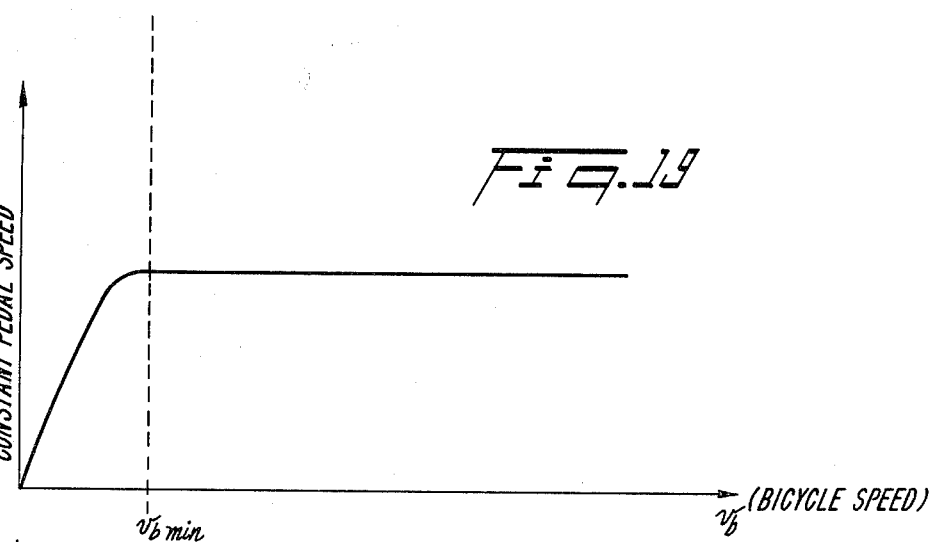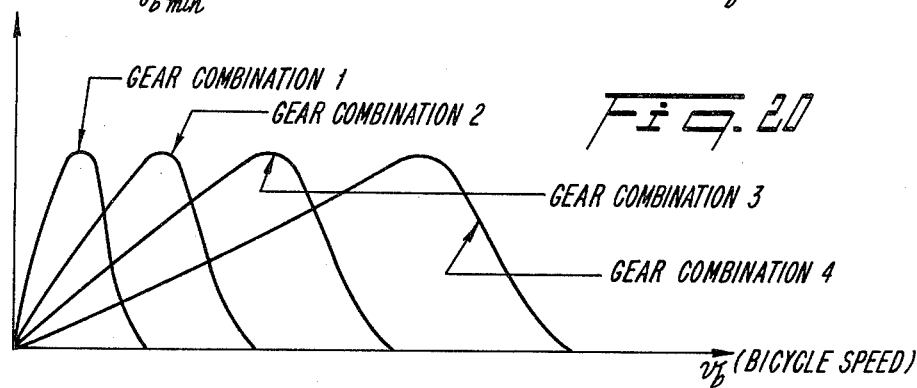

TRANSMISSION FOR A WHEELED VEHICLE

BACKGROUND AND SUMMARY OF THE PRESENT INVENTION

The invention disclosed herein pertains generally to transmission mechanisms, and more particularly to a transmission mechanism for a bicycle.

It is known in the bicycle art to transmit the power delivered by a rider to the pedals of a bicycle to a ground engaging wheel of the bicycle by the use of gears and shifting mechanisms. It is also known that high performance bicycles often have transmission mechanisms which include 10 to 15 different gear ratios and a derailleur mechanism which mechanically moves a chain from one gear combination to another. The purpose of these gears and shifting mechanisms is to enable the rider to rotate the pedals of the bicycle at whatever speed he chooses, but particularly to enable the rider to rotate the pedals over a relatively narrow pedal speed range. That is, the purpose of the gears and shifting mechanisms is to enable the rider to deliver power to the bicycle over a narrow pedal speed range, while the ground engaging wheel rotates over a much wider speed range. The reason for this is that the power that a human rider can generate varies sharply with pedal speed, i.e. the power-pedal speed curve of a human rider is sharply peaked. Thus, the gears and shifting mechanisms enable the rider to rotate the pedals over the relatively narrow pedal speed range at which the rider can deliver the maximum power which he can generate. The greater the number of gears and gear ratios, the greater the bicycle speed range over which the rider may continue to deliver effectively constant power to the ground engaging wheel while rotating the pedals at an almost constant pedal speed.

The use of intermittently tensioned springs for transmitting power to a ground engaging wheel of a bicycle, or for retracting the pedals of a bicycle, is also known in the bicycle art. For example, U.S. Pat. No. 4,108,459 issued to Alvigini, and U.S. Pat. No. 524,652 issued to Risinger, disclose bicycle transmission mechanisms which include springs that are intermittently tensioned by a bicycle rider, and which springs either continuously deliver power to a ground engaging wheel of a bicycle, or are used to retract the pedals of a bicycle which have been depressed from a first position to a second position.

The Alvigini patent (U.S. Pat. No. 4,108,459) discloses a spring powered bicycle. This bicycle includes a spring drum which is incorporated in a ground engaging wheel of the bicycle. The bicycle also includes a drive shaft on which the spring drum is rotatably mounted. Contained within the spring drum is a spiral spring, an inner end of which is connected to the drive shaft and an outer end of which is connected to an outer periphery of the spring drum. A free wheeling clutch is mounted on the outside face of the spring drum and has a matching section on an inside face of the ground engaging wheel.

In the Alvigini device, two shafts are rotatably mounted on the bicycle. A lever is rigidly connected to each of the shafts and a pedal is connected to each lever. The rotatable shafts are linked to the drive shaft by a oneway clutch, a set of gears, a pair of sprocket wheels, and a transmission chain. Thus when the pedals are depressed, the spiral spring is wound up. But as the spiral spring winds up it also continuously unwinds on its outer end, causing the spring drum to rotate, thereby rotating the ground engaging wheel.

The Risinger patent (U.S. Pat. No. 524,652) discloses a bicycle which includes an eccentric spring drum, and which spring drum is rotatably mounted on an axle of the bicycle. Contained within the spring drum is a cylindrical spring, a first end of which spring is connected to the spring drum and a second end of which spring is connected to the axle. The spring drum includes a ratchet portion which engages a series of wedges connected to a hub of the bicycle. The ratchet portion engages the wedges through a series of rollers. A first end of a steel strip is wound about the spring drum and a second end is connected to a set of levers, which levers may be oscillated by depressing a set of pedals connected to the levers. In use, a rider depresses the pedals, thereby rotating the spring drum in a forward direction while simultaneously tensioning the cylindrical spring. As the spring drum rotates in the forward direction, the ratchet portion engages the wedges connected to the hub, causing the hub to rotate in the forward direction. After a completion of a pedal downstroke, the spring drum is rotated in a backward direction under the influence of the tensioned cylindrical spring, causing the pedals to return to their original position.

Various transmission mechanisms which may be used in bicycles are also disclosed in the following patents: U.S. Pat. No. 96,963 issued to Repetti; U.S. Pat. No. 2,638,359 issued to Crumble; U.S. Pat. No. 1,612,739 issued to Matsumoto; U.S. Pat. No. 3,743,535 issued to Sidlauskas; U.S. Pat. No. 4,119,182 issued to Steuer; U.S. Pat. No. 3,648,809 issued to Schwerdhofer; U.S. Pat. No. 3,720,294 issued to Plamper; U.S. Pat. No. 88,238 issued to Van Anden; U.S. Pat. No. 628,249 issued to Kane; British Pat. No. 2,460 issued to Brereton et al; U.S. Pat. No. 670,608 issued to Dennis; and U.S. Pat. No. 538,324 issued to De Graff.

An ideal bicycle transmission mechanism is one which transmits to the bicycle all the power delivered by a rider of the bicycle, regardless of the bicycle speed. That is, an ideal transmission is one wherein a rider of a bicycle may choose the power which he wishes to deliver to the bicycle by rotating the pedals at a speed which corresponds to this power, and the ideal transmission will deliver all of this power to the ground engaging wheel of the bicycle. The ground engaging wheel of the bicycle may, of course, be rotating at a speed quite different from that of the pedals, and this speed may vary over a wide range. The known prior art bicycle transmission mechanisms which employ gears and shifting mechanisms are not entirely satisfactory as ideal transmission mechanisms because they tend to be cumbersome, require appreciable time for shifting, and require almost continuous shifting under rapidly varying road conditions. More importantly, these known transmission mechanisms represent only approximations to the ideal transmission mechanism because they provide only a finite number of discrete gear ratios rather than a continuous spectrum of gear ratios.

Accordingly, a primary object of the present invention is to provide an apparatus which more nearly approximates an ideal transmission mechanism.

Apparatus for transmitting power from a driving device or power source, such as a rider of a bicycle, to a driven device, such as a ground engaging wheel of a bicycle, according to the present invention, includes a frame (for example of a bicycle), an axle which is rigidly connected to the frame, a wheel (for example, a ground engaging wheel of a bicycle) which is rotatably mounted with respect to said axle, and a driver member which is rotated by the driving device. In addition, the apparatus preferably includes an elastic element, such as a spring, which stores energy delivered by the driving device to the driver member, a reversing mechanism which transmits, in reverse, a rotational motion of the driving device to the elastic element in order to cock the elastic element, and a mechanism which allows the driving device to periodically compress and release the elastic element. The apparatus also preferably includes a free-wheeling clutch, i.e. an overriding clutch, which intermittently transmits the energy stored in the elastic element to the driven member.

In a first preferred embodiment of the present invention, which embodiment is applicable to a bicycle transmission, the elastic element includes a cylindrical spring which encircles an axle of a bicycle, a first end of which spring is connected to the axle. The free-wheeling clutch includes a ratchet wheel which is rigidly connected to a ground engaging wheel of the bicycle. Rotatably mounted on the axle is a pawl mount which includes at least one pawl which periodically engages the ratchet wheel. A second end of the cylindrical spring is connected to the pawl mount.

The mechanism which allows a rider of the bicycle to periodically compress the elastic element includes a tubular member projecting from the pawl mount, which tubular member has an inner surface with at least one shoulder. A cam, which is rigidly mounted on said axle, is encircled by said tubular member.

The driver member includes a driver which is rotatably mounted on the axle. The driver is linked to the rider of the bicycle by a set of sprockets, a reversing mechanism which includes a figure-eight transmission chain, and a pair of pedals and cranks. The driver member also includes at least one ball bearing which is rotated over the surface of the cam by the driver, and which bearing periodically engages the at least one shoulder in the inner surface of the tubular member.

In a second preferred embodiment of the present invention, which second embodiment is also applicable to a bicycle transmission, the elastic element also includes a cylindrical spring which encircles an axle of a bicycle. A first end of this spring is mounted in a semi-circular notch in a spring-mount provided on the axle. The free-wheeling clutch includes a clutch cam which is rotatably mounted on the axle. A second end of the cylindrical spring is mounted in a semi-circular notch in the clutch cam. The clutch cam carries four clutch rollers which may frictionally engage an inner surface of a hub of a ground engaging wheel of the bicycle.

The mechanism which enables a rider of the bicycle to periodically compress the elastic element includes a driver cam which is rigidly mounted on the axle adjacent to the clutch cam. An outer surface of the driver cam includes two slots, or depressions. Two rollers, which rollers are referred to as the driver cam rollers and which rollers ride over the surface of the driver cam, are connected to a tubular member which projects from the clutch cam.

The driver member includes a sprocket mount which is rotatably mounted on the axle adjacent to the driver cam. The sprocket mount is linked to the rider of the bicycle by a set of sprockets, a transmission chain, and a pair of pedals and cranks. The reversing mechanism, which is interposed between the sprocket mount and the driver cam, includes a ring gear which is rotatably mounted on the sprocket mount. A tubular member projecting from the ring gear, called a cam driver, has an internal surface with four shoulders which may engage the driver cam rollers. The reversing mechanism further includes three planet gears rotatably mounted on pins projecting from the driver cam, which planet gears engage the ring gear. A sun gear, which is rigidly mounted on a tubular member projecting from the sprocket mount, engages the planet gears.

In a third preferred embodiment of the present invention, which is similar to the second embodiment, the elastic element, the clutch cam, the driver cam, and the cam driver are mounted on the axle of the bicycle. The components of the reversing mechanism are housed in a pedal hub and are mounted on a rotatable shaft, on which rotatable shaft the cranks of the bicycle are mounted.

BRIEF DESCRIPTION OF THE DRAWINGS

Preferred embodiments of the present invention are described with reference to the accompanying drawings wherein like members bear like reference numerals, and wherein:

FIG. 6 is a front view of a bicycle which includes a second preferred embodiment of a transmission apparatus, according to the present invention, for transmitting power from a rider of the bicycle to a ground engaging wheel of the bicycle;

FIG. 7 is a transverse, cross-sectional view of the second preferred embodiment of apparatus shown in FIG. 7, taken on the line 7—7;

FIG. 8a is a cross-sectional view of the apparatus shown in FIG. 7, taken on the line 8a—8a, at the beginning of the pedal drive cycle;

FIG. 8b is a cross-sectional view of the apparatus shown in FIG. 7, taken on the line 8b—8b, at the beginning of the pedal drive cycle;

FIG. 10 is a cross-sectional view of the apparatus shown in FIG. 7, taken on the line 8—8, at the end of the pedal drive cycle;

FIG. 10a is a cross-sectional view of the apparatus shown in FIG. 7, taken on the line 8a—8a, at the end of the pedal drive cycle;

FIG. 10b is a cross-sectional view of the apparatus shown in FIG. 7, taken on the line 8b—8b, at the end of the pedal drive cycle;

FIG. 13 is a transverse, cross-sectional view of the third preferred embodiment of apparatus shown in FIG. 11, taken on the line 13—13;

FIG. 14 is a cross-sectional view of the apparatus shown in FIG. 13, taken on the line 14—14, at a beginning of a pedal drive cycle;

FIG. 15 is a cross-sectional view of the apparatus shown in FIG. 7, taken on the line 15—15.

FIG. 16 is a cross-sectional view of the apparatus shown in FIG. 7, taken on the line 16—16;

FIG. 17 is a qualitative plot of a torque transmitted to a ground engaging wheel of a bicycle incorporating the present invention, as a function of time during a pedal drive cycle, assuming a rider of the bicycle is delivering power at a constant pedal speed;

FIG. 18 is a plot of an average torque transmitted to the ground engaging wheel of the bicycle incorporating the present invention, as a function of bicycle speed, assuming the rider of the bicycle is delivering power at a constant pedal speed;

FIG. 19 is a plot of an average power transmitted to the ground engaging wheel of the bicycle incorporating the present invention, as a function of bicycle speed, assuming the rider of the bicycle is delivering power at a constant pedal speed;

FIG. 20 includes plots of an average power transmitted to a ground engaging wheel of a conventional, multi-geared bicycle, as a function of bicycle speed, for a plurality of different gear combinations.

DETAILED DESCRIPTION OF THE PREFERRED EMBODIMENTS

Figure 1:
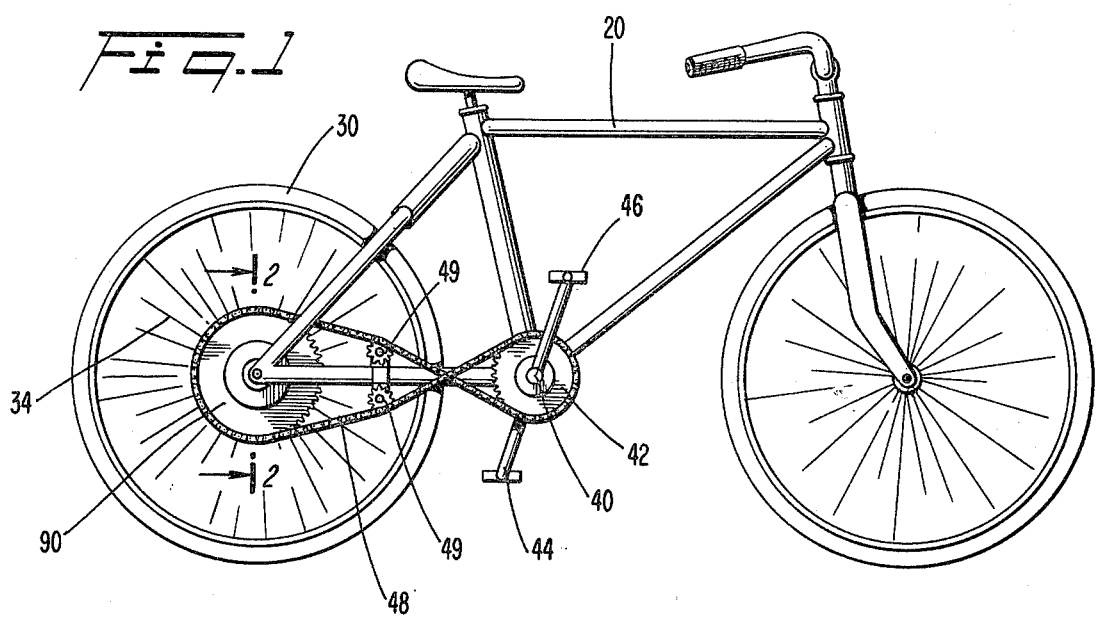
FIG. 1 is a front view of a bicycle which includes a first preferred embodiment of a transmission apparatus, according to the present invention, for transmitting power from a rider of the bicycle to a ground engaging wheel of the bicycle.
Figure 2:
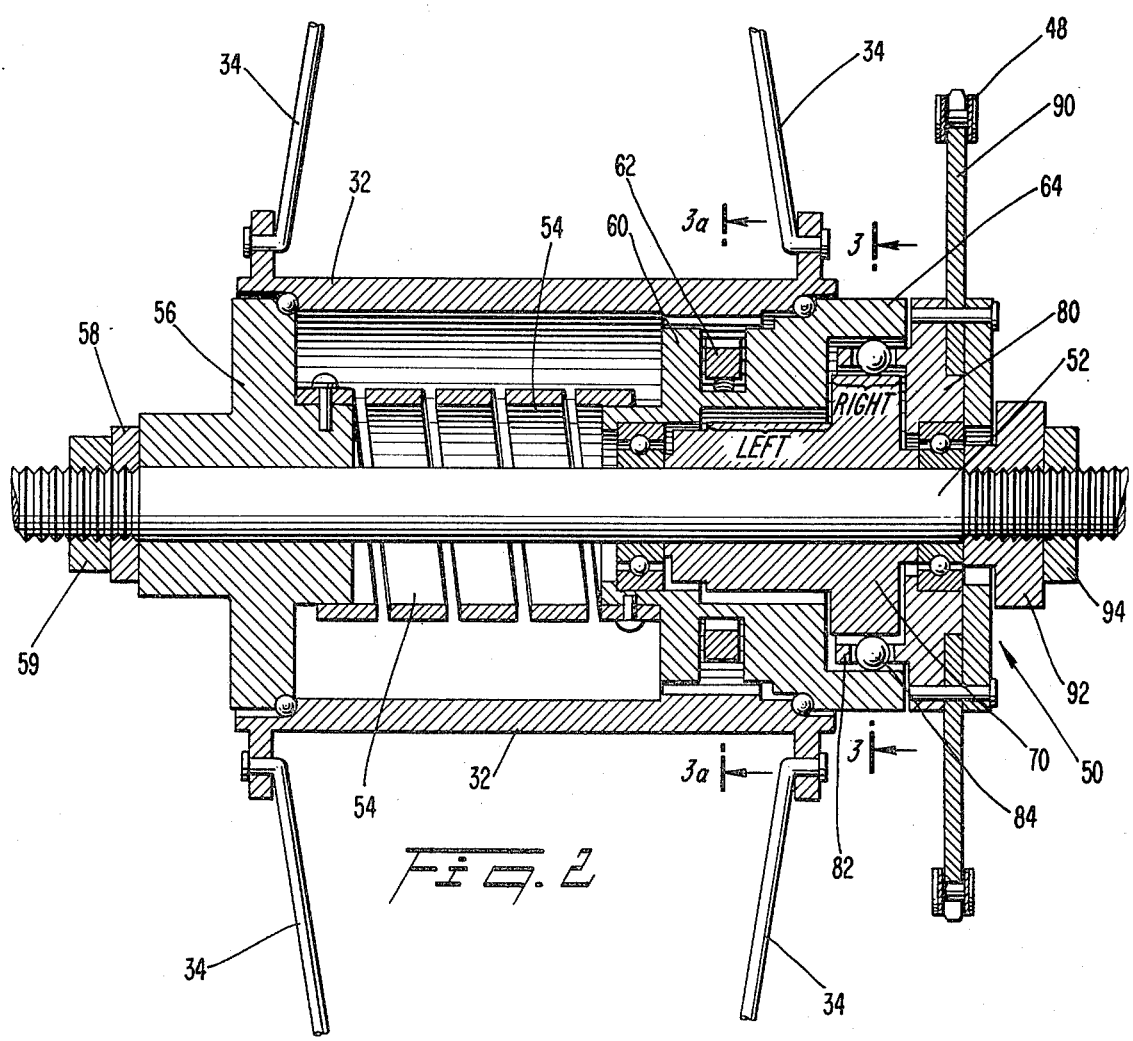
FIG. 2 is a transverse, cross-sectional view of the first preferred embodiment of apparatus shown in FIG. 1, taken on the line 2—2.

With reference primarily to FIGS. 1 and 2, a first embodiment of apparatus for transmitting power from a rider of a bicycle to the bicycle, according to the present invention, includes a bicycle frame 20, and a ground engaging wheel 30. The ground engaging wheel 30 includes a hub 32 (shown in FIG. 2) and a plurality of wheel spokes 34.

A shaft 40 is rotatably connected to the frame 20 with both a sprocket 42 and two cranks 44 rigidly connected to the shaft 40. Two pedals 46, each of which is connected to one of the cranks 44, may be selectively, drivingly engaged by the rider of the bicycle.

A motion reversing mechanism includes a figure-eight chain 48. The figure-eight chain 48 links the sprocket 42 to a sprocket 90 in a transmission mechanism 50 (shown in FIG. 2) housed in the hub 32 of the ground engaging wheel 30. Two idler gears 49, which are spring loaded to take up chain slack, separate the figure-eight chain 48 at a cross-over point.

By drivingly engaging the pedals 46, a rider of the bicycle rotates the shaft 40, as well as the sprocket 42 rigidly mounted on the shaft 40, in a clockwise direction (as viewed in FIG. 1). The clockwise rotation of the sprocket 42 produces a clockwise rotation of the portion of the figure-eight chain 48 encircling the sprocket 42. However, the portion of the figure-eight chain encircling the sprocket 90 undergoes a counterclockwise rotation and urges the sprocket 90 to also rotate in the counterclockwise direction. Thus, the figure-eight chain achieves a motion reversal for the apparatus. That is, as the sprocket 42 rotates in the clockwise direction, the sprocket 90 is made to rotate in the counterclockwise direction.

With reference particularly to FIG. 2, the transmission mechanism 50 includes an axle 52 of the wheel 30, which axle is rigid with respect to the frame 20. Encircling the axle 52 is a cylindrical spring 54. A left-hand end of the spring 54 is connected to a left main bearing and spring mount 56, which bearing and spring mount 56 is rigidly mounted on a left-hand portion of the axle 52. The bearing and spring mount 56 is prevented from undergoing a leftward longitudinal motion by a left bearing tension nut 58 and a left lock nut 59, which nuts encircle the axle 52 and are arranged adjacent a left-hand end of the bearing and spring mount 56.

A pawl mount 60 is rotatably mounted on a right hand portion of the axle 52. A right-hand end of the spring 54 is connected to a left-hand portion of the pawl mount 60. The pawl mount 60 includes two pawls 62, mounted in circular notches in the pawl mount (see also FIG. 3a). The pawls 62 carried by the pawl mount 60 may engage the teeth of a ratchet wheel which is connected to an inner surface of the hub 32.

As described in more detail below, the transmission mechanism 50 also includes an engaging mechanism mounted on the shaft 52 which enables a rider of the bicycle to periodically tension the spring 54. That is, the engaging mechanism enables the rider of the bicycle, in conjunction with the reversing mechanism described above, to rotate the pedals 46 in the clockwise direction (as viewed in FIG. 1) while periodically engaging and rotating the pawl mount 60 in the opposite direction, i.e. in the counterclockwise direction. Because the left-hand end of the spring 54 is connected to the bearing and spring mount 56 while the right-hand end of the spring 54 is connected to the pawl mount 60, the counterclockwise rotation of the pawl mount 60 by the engaging mechanism produces a tensioning of the spring 54. Thus, when the pawl mount 60 is periodically rotated in the counterclockwise direction by the engaging mechanism, the spring 54 is thereby periodically tensioned and energy is periodically stored in the spring. On the other hand, when the pawl mount 60 is periodically freed by the engaging mechanism, the spring 54, which has previously been tensioned, is then able to rotate the pawl mount 60 in the clockwise direction. As the pawl mount 60 is rotated in the clockwise direction the two pawls 62 carried by the pawl mount 60 engage the teeth of the ratchet wheel in the inner surface of the hub 32, thereby transferring the energy previously stored in the spring 54 to the ground engaging wheel 30.

With reference again to FIG. 2, the engaging mechanism referred to above includes a tubular member 64 which is connected to, and which extends to the right of, the pawl mount 60. The engaging mechanism also includes a cam 70 which is rigidly mounted on the axle 52, adjacent to and to the right of the pawl mount 60. The cam 70 includes an outer surface having a left-hand portion, denoted by "Left", and a right-hand portion, denoted by "Right." The pawls 62 are arranged on the pawl mount adjacent the left-hand portion of the outer surface of the cam 70. The axially extending tubular member 64 of the pawl mount 60 encircles substantially the whole of the right-hand portion of the outer surface of the cam 70.

A driver 80 is rotatably mounted on the axle 52 adjacent to, and to the right of, the cam 70. The driver 80 includes a tubular member 82 which projects axially to the left, and which encircles the right-hand portion of the outer surface of the cam 70. The leftward projecting tubular member 82 is positioned between the outer surface of the cam 70 and an inner surface of the rightwardly extending tubular member 64. The leftward projecting tubular member 82 includes a cylindrical wall having apertures which contain ball bearings 84. The ball bearings 84 are in contact with the right-hand portion of the outer surface of the cam 70.

The sprocket 90 is rigidly mounted on the driver 80. One end of the figure-eight chain 48 (shown in FIG. 1), which chain encircles the sprocket 42 (shown in FIG. 1), also encircles the sprocket 90. The ratio of the diameter of the sprocket 90 and driver 80, to the diameter of the sprocket 42, may, for example, be two-to-one.

A right bearing tension nut 92, as well as a right lock nut 94, encircle the axle 52 at a point adjacent to, and to the right of, the driver 80. These nuts prevent the pawl mount 60, the cam 70, and the driver 80 from undergoing a rightward longitudinal motion along the axle 52.

The axle 52 is rigidly connected to the frame 20 of the bicycle by conventional means (not shown).

Figure 3:
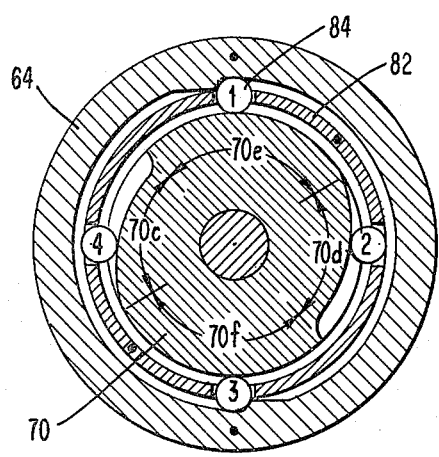
FIG. 3 is a cross-sectional view of the apparatus shown in FIG. 2, taken on the line 3—3, at a beginning of a pedal drive cycle.
Figure 3A:
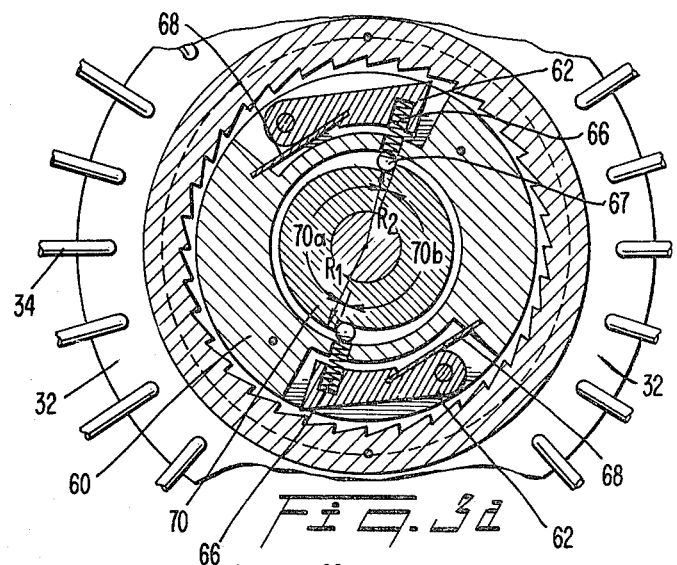
FIG. 3a is a cross-sectional view of the apparatus shown in FIG. 2, taken on the line 3a—3a, also at the beginning of the pedal drive cycle.

With reference now to FIG. 3a, a left-hand portion of the outer surface of the cam 70 includes two segments, 70a and 70b, each of which segments has a surface with a radius which varies from a first relatively large radius $R_1$ to a second relatively small radius $R_2$. Each segment of the left-hand portion of the outer surface of the cam 70 also has a shoulder which defines a juncture between the radius $R_1$ and the radius $R_2$.

The pawl mount 60 includes two pawls 62, which pawls are pivotably connected to an outer surface of the pawl mount at two points which are diametrically opposed to one another. Each of the pawls 62 is urged to pivot into engagement with the teeth of the ratchet wheel connected to the hub 32 by a pawl-biasing spring 66. A first end of each of the springs 66 is arranged within a cavity in a lower surface of each of the pawls 62. A second end of each of the springs 66 projects through a slot in a cylindrical wall of the pawl mount 60, which cylindrical wall encircles the left-hand portion of the cam 70. The second end of each of the springs 66 projecting through the cylindrical wall of the pawl mount 60 is mounted on a ball 67. Each of the balls 67 rests on the surface of one of the two segments of the outer surface of the left-hand portion of the cam 70.

A reset spring 68, in the form of a leaf spring, urges each of the pawls 62 to pivot out of engagement with the ratchet wheel in the hub 32. A first end of each of the reset springs 68 is arranged between a lower portion of each of the pawls 62 and an outer surface of the pawl mount 60, adjacent one of the points where the pawls 62 are pivotably connected to the pawl mount 60. This first end of each reset spring 68 is connected to an outer surface of the pawl mount 60. A second end of each of the reset springs 68 is connected to a lower surface of each of the pawls 62.

With reference now to FIG. 3, the outer surface of the right-hand portion of the cam 70 includes two concave segments, 70c and 70d, and two convex segments, 70e and 70f. Each concave segment is arranged between the two convex segments.

The tubular member 82, which member projects axially leftward from the driver 80 (not shown in FIG. 3) to encircle the outer surface of the right-hand portion of the cam 70, carries four ball bearings 84 (denoted by numerals 1, 2, 3, and 4) located in apertures in the cylindrical side wall of the tubular member 82. These apertures in which the ball bearings 84 are located are arranged so that adjacent apertures are ninety degrees from each other. The ball bearings 84 in these apertures are in contact with the outer surface of the right-hand portion of the cam 70.

The tubular member 64, which projects axially rightward from the pawl mount 60, encircles the tubular member 82. The tubular member 64 includes an inner surface having two shoulders, 64a and 64b (see FIG. 4), which two shoulders are positioned one hundred and eighty degrees from each other. The two shoulders in the inner surface of the tubular member 64 may be engaged by the ball bearings 84.

The first embodiment of apparatus described above operates cyclically as follows. With reference to FIG. 1, one of the pedals 46 is initially assumed to be at about twenty degrees to the vertical. This pedal may be drivingly engaged by a rider of the bicycle and rotated in the clockwise direction through one hundred and eighty degrees. A complete one hundred and eighty degree rotation of one of the pedals 46 constitutes one complete pedal drive cycle. Of course, after one pedal 46 has been rotated through one hundred and eighty degrees, the other pedal 46 will have moved into a position at about twenty degrees to the vertical, and it too may then be drivingly engaged and rotated through one hundred and eighty degrees.

When one of the pedals 46 is at about twenty degrees to the vertical, the position of this pedal, as well as the corresponding relative positions of the components of the first embodiment of the present invention, constitutes a beginning of a pedal drive cycle. After the pedal 46 has been rotated through ninety degrees in the clockwise direction, the resulting position of the pedal 46 and of the components of the first embodiment constitutes a middle of the pedal drive cycle. After the pedal 46 has been rotated through yet another ninety degrees in the clockwise direction, i.e. after the pedal 46 has been rotated through a full one hundred and eighty degrees, the resulting position of the pedal 46 and of the components of the first embodiment constitutes an end of one pedal drive cycle and the beginning of another.

A clockwise rotation of one of the pedals 46 produces an identical clockwise rotation of the sprocket 42. As the pedal 46 and the sprocket 42 rotate through one hundred and eighty degrees in the clockwise direction the figure-eight chain encircling sprockets 42 and 90 causes the sprocket 90, and the driver 80 (not shown in FIG. 1) on which the sprocket 90 is mounted, to rotate through ninety degrees in the counterclockwise direction. This ninety degree rotation is due to the two-to-one ratio of the diameter of sprocket 90 to the diameter of the sprocket 42. Because the driver 80 undergoes only half the angular rotation that the pedal 46 and the sprocket 42 undergo, the driver 80 arrives at the middle of a pedal drive cycle after rotating forty-five degrees in the counterclockwise direction. Similarly, the driver 80 arrives at the end of a pedal drive cycle after rotating an additional forty-five degrees in the counterclockwise direction, i.e. after rotating a total of ninety degrees in the counterclockwise direction.

With reference to FIG. 3, the relative positions of the components of the first preferred embodiment of apparatus, at a beginning of a pedal drive cycle, are such that two of the ball bearings 84, denoted by the numerals "1" and "3", are each positioned on a convex segment of the outer surface of the right-hand portion of the cam 70. Each of these two ball bearings is in contact with one of the two shoulders in the inner surface of the tubular member 64, which tubular member is connected to the pawl mount 60 (not shown in FIG. 3). The two ball bearings denoted by the numerals "2" and "4" are each positioned on a concave segment of the cam 70.

With reference to FIG. 3a, the position of the pawl mount 60, at the beginning of the pedal drive cycle, is such that each of the balls 67, each of which balls carries a pawl biasing spring 66, is positioned on the left-hand portion of the outer surface of the cam 70, at a shoulder which defines the juncture between a segment having a radius $R_1$ and a segment having a radius $R_2$. In this position, each of the pawls 62 is too far from the ratchet in the inner surface of the hub 32 for the pawl biasing springs 66 to urge the pawls 67 into engagement with the ratchet teeth.

With reference once again to FIG. 3, as the driver 80 (not shown in FIG. 3) begins to rotate in the counterclockwise direction at the beginning of the pedal drive cycle, the tubular member 82 connected to the driver 80 also begins to rotate in the counterclockwise direction. As the tubular member 82 begins to rotate in the counterclockwise direction two of the four ball bearings 84 carried by the tubular member 82, and denoted by the numerals "1" and "3", engage the two shoulders in the inner surface of tubular member 64. Because the tubular member 64 is connected to the pawl mount 60 (not shown in FIG. 3) the pawl mount 60 also rotates in the counterclockwise direction. The counterclockwise rotation of the pawl mount 60, to which pawl mount the spring 54 is connected, produces a tensioning of the cylindrical spring 54.

Figure 4:
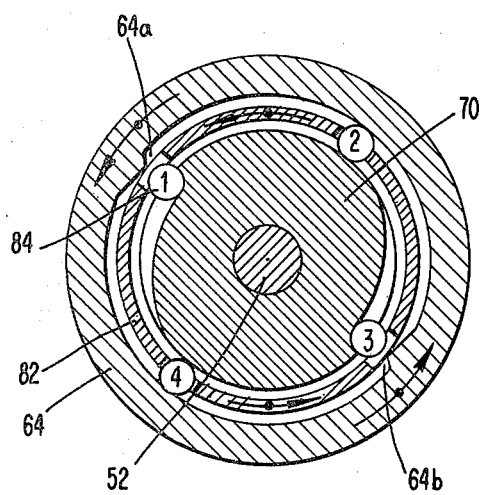
FIG. 4 is a cross-sectional view of the apparatus shown in FIG. 2, taken on the line 3—3, at a middle of the pedal drive cycle.

With reference to FIG. 4, after the driver 80 (not shown in FIG. 4), and the tubular member 82 connected to the driver 80, have rotated through forty-five degrees in the counterclockwise direction, which position defines a middle of the pedal drive cycle, the two bearings "1" and "3" engaging the two shoulders in the inner surface of the tubular member 64 fall into the two concave segments in the right-hand portion of the outer surface of the cam 70. When this occurs the pawl mount 60 (not shown in FIG. 4), which is connected to the tubular member 64, and, accordingly, the spring 54 (also not shown in FIG. 4) become disengaged from the driver 80.

Figure 4A:
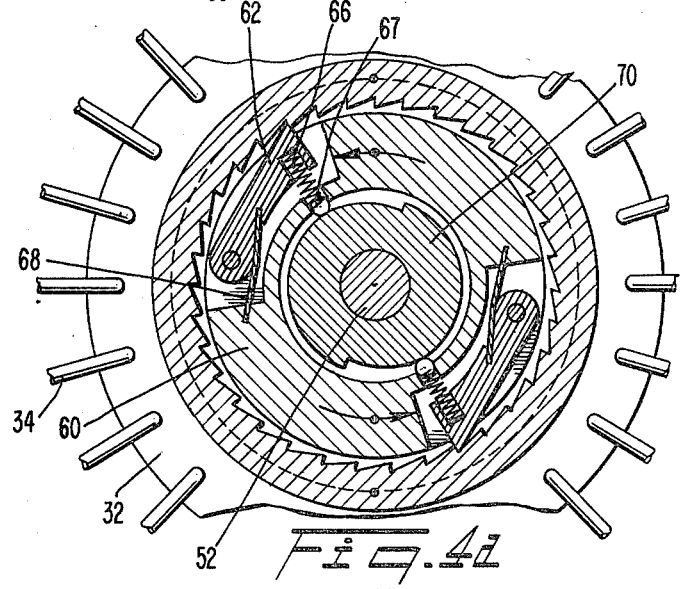
FIG. 4a is a cross-sectional view of the apparatus shown in FIG. 2, taken on the line 3a—3a, also at the middle of the pedal drive cycle.

With reference to FIG. 4a, as the pawl mount 60 is rotated through forty-five degrees in the counterclockwise direction, the balls 67, on which the pawl-biasing springs 66 are mounted, move in a counterclockwise direction over the left-hand portion of the outer surface of the cam 70. After moving in the counterclockwise direction through forty-five degrees each of the balls 67 reaches a segment of the left-hand portion of the outer surface of the cam 70 where the radius of the outer surface is $R_1$. It is in this position, where each of the springs 66 is relatively close to the ratchet wheel in the hub 32, that the springs 66 can bias each of the pawls 62 to pivot into engagement with the ratchet wheel in the hub 32. In biasing the pawls 62 to pivot into engagement with the ratchet wheel in the hub 32 the springs 66 overcome a radially inwardly directed biasing force exerted by the reset springs 68, which reset springs urge the pawls 62 to pivot out of engagement with the ratchet wheel.

Figure 5:
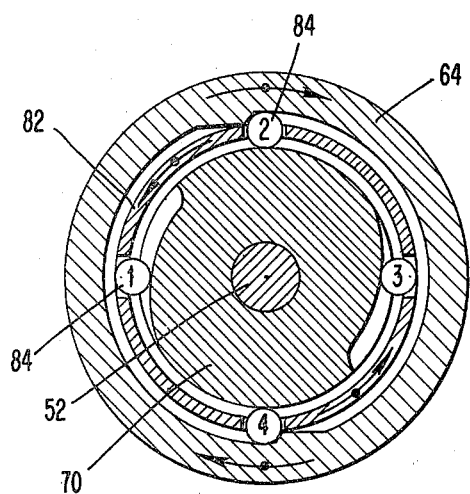
FIG. 5 is a cross-sectional view of the apparatus shown in FIG. 2, taken on the line 3—3, at an end of the pedal drive cycle.

With reference to FIG. 5, after the pawl mount 60 (not shown in FIG. 5), and the tubular member 64 connected to the pawl mount 60, become disengaged from the driver 80, the tensioned cylindrical spring 54 (not shown in FIG. 5) rotates the pawl mount 60 and the tubular member 64 through forty-five degrees in the clockwise direction. While the pawl mount 60 and the tubular member 64 are rotating through forty-five degrees in the clockwise direction, the driver 80 and the tubular member 82 connected to the driver 80 continue to rotate in the counterclockwise direction through an additional forty-five degrees. After completing their respective rotations the resulting positions of the driver 80, the tubular member 82, the pawl mount 60, and the tubular member 64, define an end of the pedal drive cycle. Because the pawls 62 (not shown in FIG. 5) carried by the pawl mount 60 have been brought into engagement with the ratchet wheel in the hub 32 (see FIG. 2), the clockwise rotation of the pawl mount 60 results in the ground engaging wheel 30 also being rotated in the clockwise direction. Thus the energy stored in the cylindrical spring 54 is transmitted to the ground engaging wheel 30. It is to be noted that substantially all of the energy stored in the cylindrical spring during the interval between the beginning and the end of a pedal drive cycle is delivered to the ground engaging wheel 30 if the tensioned cylindrical spring 54 rotates the pawl mount 60 in the clockwise direction through a full forty-five degrees.

Figure 5A:
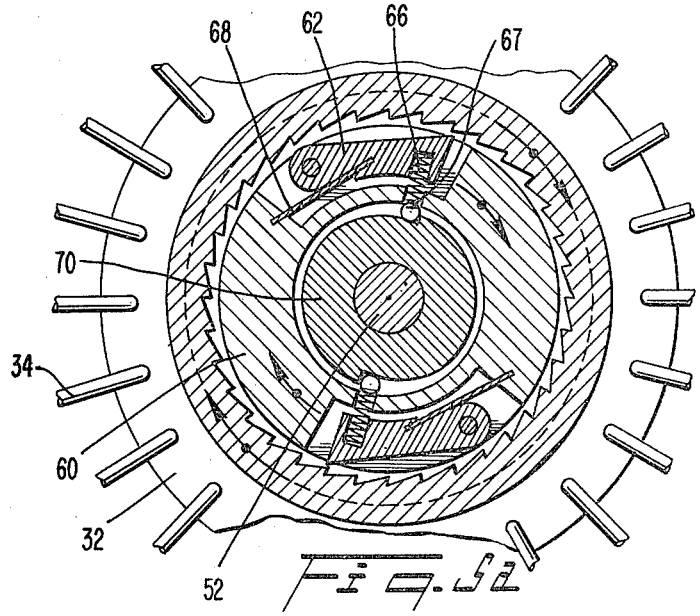
FIG. 5a is a cross-sectional view of the apparatus shown in FIG. 2, taken on the line 3a—3a, also at the end of the pedal drive cycle.

With reference to FIG. 5a, as the pawl mount 60 rotates in the clockwise direction through forty-five degrees, each of the balls 67 simultaneously moves in the clockwise direction over the left hand portion of the outer surface of the cam 70. This clockwise motion of the balls 67 continues until each of the balls 67 reaches a segment of the left-hand portion of the outer surface of the cam 70 having a radius $R_2$. It is in this position, where each of the springs 66 is relatively far from the ratchet wheel in the hub 32, that the springs 66 can no longer bias the pawls 62 to pivot into engagement with the ratchet wheel in the hub 32. Rather, the biasing force exerted by each of the reset springs 68 is now sufficient to pivot each of the pawls 62 out of engagement with the ratchet wheel in the hub 32.

With reference once again to FIG. 5, after the pawl mount 60 and the tubular member 64 have completed their forty-five degree clockwise motions, the two ball bearings not previously in contact with the two shoulders in the inner surface of the tubular member 64, i.e. the two ball bearings denoted by the numerals "2" and "4", have meanwhile been rotated through an additional forty-five degrees in the counterclockwise direction by the tubular member 82 into position to engage these shoulders. Thus, the constitutes an end of one pedal drive cycle and the beginning of another.

In summary, the operation of the present invention is such that as a rider of the bicycle rotates one of the pedals 46 through one hundred and eighty degrees in the clockwise direction, the driver 80 is rotated through ninety degrees in the counterclockwise direction. As the driver 80 rotates through an initial forty-five degrees in the counterclockwise direction, the driver 80 actuates the engaging mechanism to engage and rotate the pawl mount 60 through forty-five degrees in the counterclockwise direction. As the pawl mount 60 rotates through forty-five degrees in the counterclockwise direction the cylindrical spring 54, one end of which is connected to the pawl mount 60, is tensioned.

After the driver 80 has rotated through the initial forty-five degrees in the counterclockwise direction, the engaging mechanism becomes disengaged from the pawl mount 60. Thus, as the driver 80 continues to rotate through another forty-five degrees in the counterclockwise direction, the tensioned cylindrical spring 54 rotates the pawl mount 60 through forty-five degrees in the clockwise direction. As the pawl mount 60 rotates in the clockwise direction through forty-five degrees, the two pawls 62 carried by the pawl mount 60 engage the ratchet wheel in the hub 32 of the ground engaging wheel 30, rotating the wheel 30 in the clockwise direction, thereby propelling the bicycle in the forward direction.

An important feature of the transmission apparatus, and method of operation, described above is that after the cylindrical spring 54 has relaxed and the pawls 62 have pivoted out of engagement with the ratchet wheel in the hub 32, the ground engaging wheel is freed from the transmission mechanism. Thus, in this condition the bicycle may be backed up. That is, the bicycle may be rolled in a direction opposite to an original forward direction, to permit the bicycle to be parked, for example.

With reference primarily to FIG. 6 and secondarily to FIG. 7, a second embodiment of apparatus for transmitting power from a rider of a bicycle to the bicycle, according to the present invention, includes a bicycle frame 100, and a ground engaging wheel 110. The ground engaging wheel 110 includes a hub 112 (shown in FIG. 7) and a plurality of wheel spokes 114.

A shaft 120 is rotatably connected to the frame 100, with both a sprocket 122 and two cranks 124 rigidly connected to the shaft 120. Two pedals 126, each of which is connected to one of the cranks 124, may be selectively, drivingly engaged by the rider of the bicycle.

A transmission chain 128 links the sprocket 122 to a sprocket 162 in a transmission mechanism 130 (shown in FIG. 7) housed in the hub 112 of the ground engaging wheel 110. In this second embodiment of the present invention, unlike the first embodiment, a clockwise rotation of the sprocket 122 also results in a clockwise rotation of the sprocket 162. A spring-loaded idler sprocket 129 maintains the transmission chain 128 under tension, and prevents "flyback" when a compressed elastic member, mounted on an axle of the ground engaging wheel 110, is periodically released.

With reference primarily to FIG. 7 and secondarily to FIG. 16, the transmission mechanism 130 includes an axle 132 of the wheel 110, which axle is rigid with respect to the frame 100. Encircling the axle 132 is a cylindrical spring 134. A left-hand end of the spring 134 is mounted in a semi-circular notch in a right-hand end of a bearing and spring mount 136, which bearing and spring mount 136 is mounted on a left-hand portion of the axle 132. As shown in FIG. 16, a tip of the left-hand end of the spring 134 mounted in the semi-circular notch in the right-hand end of the bearing and spring mount 136 abuts against an end wall of the semi-circular notch. Thus when a right-hand end of the spring 134 is rotated in a counterclockwise direction (as viewed from the right in FIG. 7) the left-hand end of the spring 134 is held stationary.

With reference to FIG. 7, a spring tension adjustment gear 138 is mounted on the bearing and main spring mount 136. The bearing and main spring mount 136 is prevented from undergoing a leftward longitudinal motion by a left bearing tension nut 140, which nut encircles a threaded portion of the axle 132 and is arranged adjacent a left-hand end of the bearing and spring mount 136.

With reference to FIG. 7 and FIG. 8b, a cam 142, hereinafter referred to as the clutch cam, is rotatably mounted on a right-hand portion of the axle 132. A right-hand end of the spring 134 is mounted in a semi-circular notch in a left-hand portion of the clutch cam 142. As shown in FIG. 8b, a tip of the right-hand end of the spring 134 mounted in the semi-circular notch in the left-hand portion of the clutch cam 142 abuts against an end wall of this semi-circular notch. Thus, if the clutch cam 142 is rotated in a counterclockwise direction (as viewed from the right in FIG. 7), this end wall in the semi-circular notch is also rotated in the counterclockwise direction. Because the tip of the right-hand end of the spring 134 abuts against this end wall, it follows that the right-hand end of the spring 134 will also be rotated in the counterclockwise direction.

With reference primarily to FIG. 8b and secondarily to FIG. 7, an outer surface of the clutch cam 142, which outer surface is substantially circular, includes four recesses, or notches, each of which recesses contains a roller 144. These recesses are substantially triangular in cross section, i.e., they each include a wide portion which gradually merges into a narrow portion. Each of the recesses also contains a tension spring 145, one end of which spring is arranged in a cylindrical aperture in the wall of the recess, and another end of which is in contact with the roller 144. The rollers 144 are hereinafter referred to as the clutch cam rollers. The clutch cam rollers may frictionally engage an inner surface of the hub 112.

With reference once again to FIG. 8b and FIG. 7, two pins 143a and 143b, rigidly connected to a right-hand end of the clutch cam 142, project to the right from the clutch cam 142. The pins 143a and 143b are one hundred and eighty degrees apart from one another, and are arranged radially inward relative to the semi-circular notch in the left-hand portion of the clutch cam 142.

As described in more detail below, the transmission mechanism 130 also includes a reversing mechanism and an engaging mechanism, both of which mechanisms are mounted on the axle 132, and which mechanisms enable a rider of the bicycle to periodically tension the spring 134. That is, the reversing and engaging mechanisms enable the rider of the bicycle to rotate the pedals 126 in the clockwise direction (as viewed in FIG. 6) while periodically engaging and rotating the clutch cam 142 in the opposite direction, i.e. in the counterclockwise direction. Because the left-hand end of the spring 134 is mounted in the semi-circular notch in the bearing and spring mount 136, and the right-hand end of the spring 134 is mounted in the semi-circular notch in the the clutch cam 142, as described above, the counterclockwise rotation of the clutch cam 142 by the reversing and engaging mechanisms produces a tensioning of the spring 134. Thus, when the clutch cam 142 is periodically rotated in the counterclockwise direction by the reversing and engaging mechanisms, the spring 134 is thereby periodically tensioned and energy is periodically stored in the spring. On the other hand, when the clutch cam 142 is periodically freed by the engaging mechanism, the spring 134, which has previously been tensioned, is then able to rotate the clutch cam 142 in the clockwise direction. As the clutch cam 142 is rotated in the clockwise direction the four clutch cam rollers 144 carried by the clutch cam 142 frictionally engage the inner surface of the hub 112 thereby transferring the energy previously stored in the spring 134 to the ground engaging wheel 110.

With reference to FIG. 7 and FIG. 8a, the engaging mechanism referred to above includes a tubular member 146 projecting from the clutch cam 142. The tubular member 146 projects to the right of the clutch cam 142. As shown more clearly in FIG. 8a, the tubular member 146 contains two longitudinal recesses, which recesses are approximately one hundred and eighty degrees apart from one another. Each of the recesses in the tubular member 146 contains a roller 147. The rollers 147 are hereinafter referred to as the driver cam rollers.

With reference again to FIG. 7 and FIG. 8a, a cam 148 is rigidly mounted on the axle 132, adjacent to and to the right of the clutch cam 142. The cam 148 is hereinafter referred to as the driver cam. The driver cam 148 is rigidly mounted on the axle 132 by means of a key 149. As shown in FIG. 8a, the driver cam 148 includes an outer surface which is substantially circular. The outer surface of the driver cam 148 includes two recesses, or notches, which recesses are approximately one hundred and eighty degrees apart from one another. The outer surface of the driver cam 148 is encircled by the tubular member 146 projecting from the clutch cam 142. The driver cam rollers 147, carried by the tubular member 146, ride over the outer surface of the driver cam 148.

With reference again to FIG. 7 and FIG. 8a, a right-hand end of the driver cam 148 contains three equiangularly spaced longitudinal apertures. Each of these longitudinal apertures contains a pin 150. Each of the pins 150 projects to the right of the driver cam 148. Mounted on each of the pins 150 is a planet gear 152.

With reference to FIG. 8a and FIG. 7, a left-hand end of the driver cam 148 is provided with two circular slots 151a and 151b. Each of these slots is arranged adjacent one of the recesses or notches in the outer surface of the driver cam 148, and each of the slots subtends an angle of forty-five degrees. The pin 143a projecting from the right-hand end of the clutch cam 142 projects into an interior of the slot 151a, while the pin 143b projects into an interior of the slot 151b. An initial relative position of the clutch 142 and the driver cam 148 is such that the pin 143a initially abuts against a right-hand end of the slot 151a (as viewed in FIG. 8a), while the pin 143b initially abuts against a left-hand end of the slot 151b. The slots 151a and 151b permit the pins 143a and 143b, and thus the clutch cam 142, to rotate through forty-five degrees in a counterclockwise direction (as viewed in FIG. 8b), relative to the initial position, but prevent the pins 143a and 143b and the clutch cam 142 from undergoing a clockwise rotation relative to the initial position.

Figure 8:
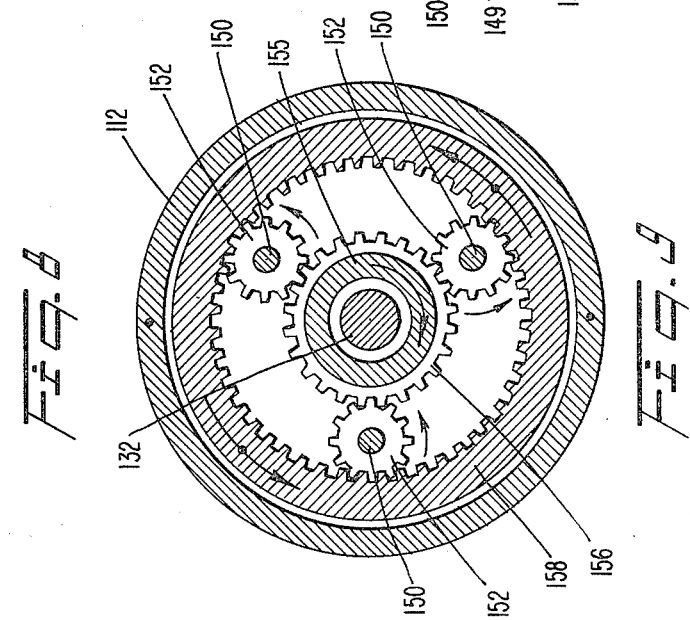
FIG. 8 is a cross-sectional view of the apparatus shown in FIG. 7, taken on the line 8—8, at the beginning of a pedal drive cycle.

With reference to FIG. 7 and FIG. 8, the reversing mechanism referred to above includes a nut 164, which nut encircles a right-hand, threaded portion of the axle 132. Rotatably mounted on the nut 164 is a sprocket mount 154. A tubular member 155, which tubular member is connected to the sprocket mount 154, projects to the left from the sprocket mount 154. The tubular member 155 encircles the axle 132 and is arranged between the driver cam 148 and the sprocket mount 154. Mounted on the tubular member 155 is a sun gear 156. As shown in FIG. 8, the teeth of the sun gear 156 may engage the teeth of the three planet gears 152, each of which planet gears is mounted on one of the pins 150 projecting from the driver cam 148 (not shown in FIG. 8).

With reference primarily to FIGS. 7 and 8a, and secondarily to FIG. 8, a ring gear 158 is rotatably mounted on the sprocket mount 154. As shown in FIG. 8, the teeth of the three planet gears 152 may engage the teeth of the ring gear 158. As shown in FIG. 7, connected to the ring gear 158, and projecting to the left from the ring gear 158, is a tubular member 160. This tubular member 160 is hereinafter referred to as the cam driver. As shown in FIG. 8a, the cam driver 160, which is a component of the engaging mechanism, encircles the driver cam 148 as well as the driver cam rollers 147, which rollers roll over the outer surface of the driver cam 148. An inner surface of the cam driver 160 includes four shoulders which are spaced ninety degrees apart from one other. The shoulders in the inner surface of the cam driver 160 may engage the driver cam rollers 147.

With reference to FIGS. 6, 7, and 8, and as described above, the sprocket 162 is rigidly mounted on the sprocket mount 154. One end of the transmission chain 128, which chain encircles the sprocket 122, also encircles the sprocket 162. The sprocket mount 154 includes a tubular member 155. As shown in FIG. 8 the sun gear 156 is mounted on the tubular member 155, and this sun gear has teeth which mesh with those of the planet gears 152. The planet gears 152 have teeth which mesh with those of the ring gear 158. As is described below, a clockwise rotation of the sprocket 122 results in a counterclockwise rotation of the ring gear 158. The dimensions of the sprockets 122 and 162, and the dimensions of the gears 156, 152, and 158 may be such as to produce an equivalent static gear ratio of two-to-one. That is, the dimensions of the above noted members may be such that a one hundred and eighty degree clockwise rotation of the sprocket 122 produces a ninety degree counterclockwise rotation of the ring gear 158.

With reference to FIG. 7, the axle 132 is rigidly connected to the frame 100 of the bicycle by conventional means (not shown).

The second embodiment of apparatus described above operates cyclically as follows. With reference to FIG. 6, one of the pedals 126 is initially assumed to be at about twenty degrees to the vertical. This pedal may be drivingly engaged by a rider of the bicycle and rotated in the clockwise direction through one hundred and eighty degrees. A complete one hundred and eighty degree rotation of one of the pedals 126 constitutes one complete pedal drive cycle. Of course, after one pedal 126 has been rotated through one hundred and eighty degrees, the other pedal 126 will have moved into a position at about twenty degrees to the vertical, and it too may then be drivingly engaged and rotated through one hundred and eighty degrees.

When one of the pedals 126 is at about twenty degrees to the vertical, the position of this pedal, as well as the corresponding relative positions of the components of the second embodiment of apparatus of the present invention, constitutes a beginning of a pedal drive cycle. After the pedal 126 has rotated through ninety degrees in the clockwise direction, the resulting position of the pedal 126 and of the components of the second embodiment constitutes a middle of the pedal drive cycle. After the pedal 126 has been rotated through yet another ninety degrees in the clockwise direction, i.e. after the pedal 126 has been rotated through a full one hundred and eighty degrees, the resulting position of the pedal 126 and of the components of the second embodiment constitutes an end of one pedal drive cycle and the beginning of another.

A clockwise rotation of one of the pedals 126 produces an identical clockwise rotation of the sprocket 122. As the pedal 126 and the sprocket 122 rotate through one hundred and eighty degrees in the clockwise direction, the transmission chain 128, encircling sprockets 122 and 162, causes the sprocket 162 and the sprocket mount 154 (not shown in FIG. 6), on which the sprocket 162 is mounted, to also rotate in the clockwise direction.

Figure 9B:
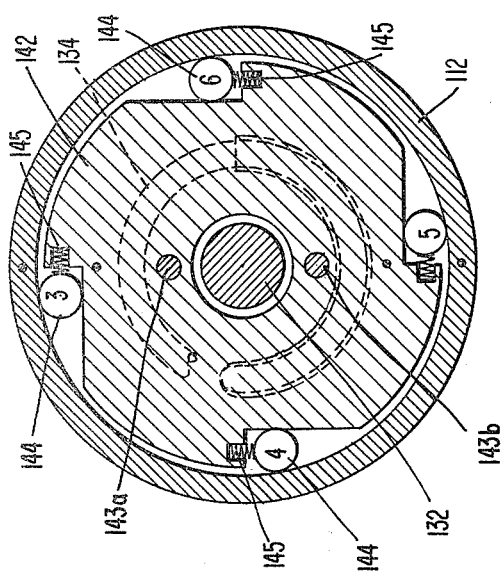
FIG. 9b is a cross-sectional view of the apparatus shown in FIG. 7, taken on the line 8b—8b, at the middle of the pedal drive cycle.
Figure 9C:
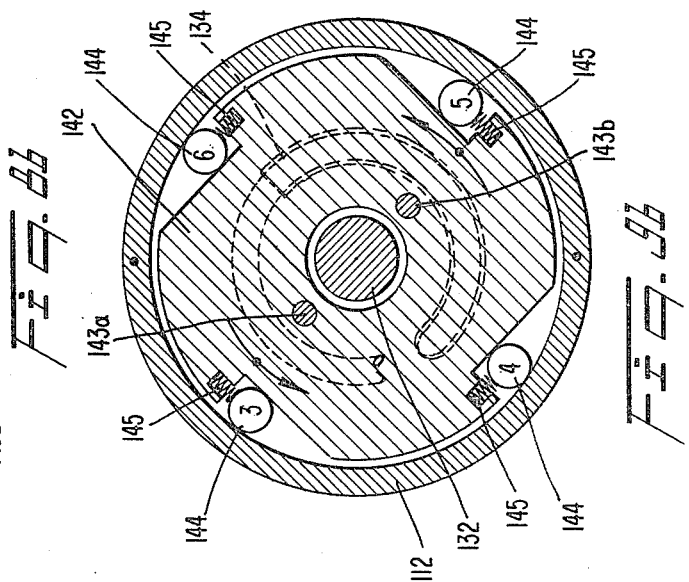
FIG. 9 is a cross-sectional view of the apparatus shown in FIG. 7, taken on the line 8—8, at a middle of the pedal drive cycle.
FIG. 9a is a cross-sectional view of the apparatus shown in FIG. 7, taken on the line 8a—8a, at the middle of the pedal drive cycle.
Figure 9E:
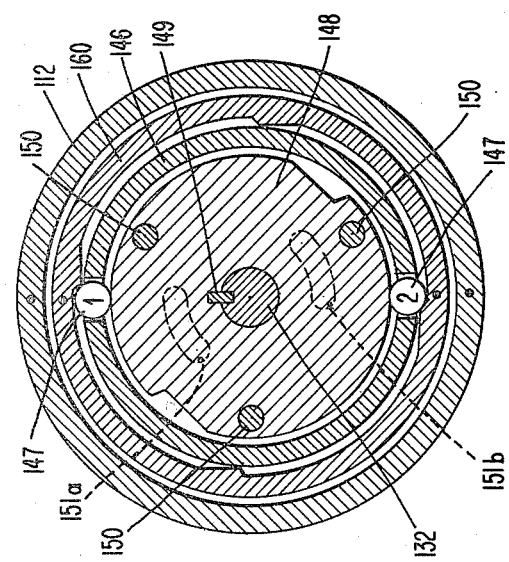
Figure 9D:
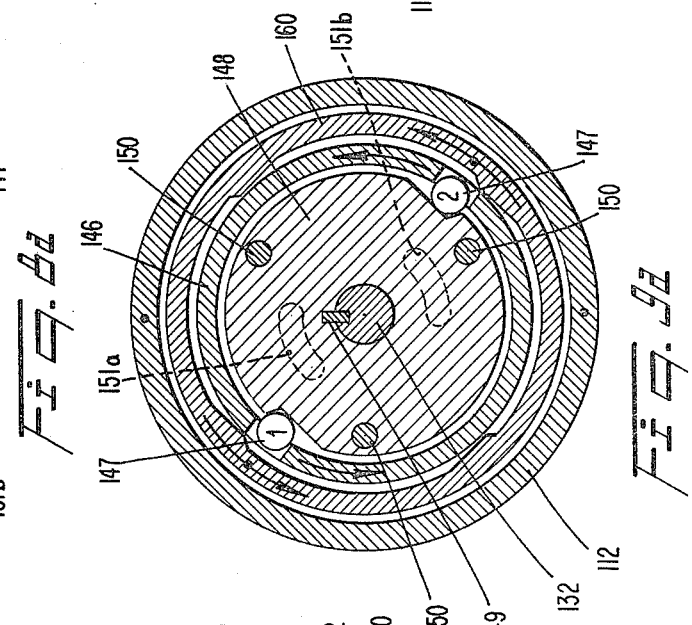
Figure 9:
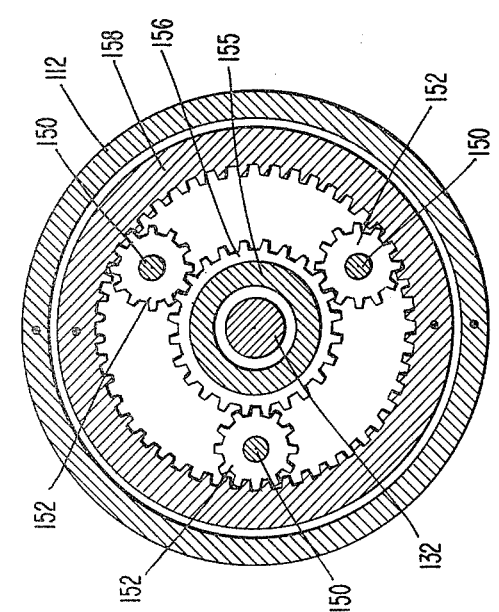

With reference to FIGS. 8 and 9, the clockwise rotation of the sprocket mount 154 (not shown in FIGS. 8 and 9) produces an identical rotation of the tubular member 155, which tubular member is connected to the sprocket mount 154. Mounted on the tubular member 155 is the sun gear 156, which undergoes an identical clockwise motion. As the sun gear 156 rotates in the clockwise direction, the teeth of the sun gear mesh with the teeth of the planet gears 152, causing the planet gears to rotate in the opposite direction, i.e. in a counterclockwise direction. The teeth of the planet gears 152 in turn mesh with the teeth of the ring gear 158 causing the ring gear, in turn, to rotate in the counterclockwise direction. As the ring gear 158 rotates in the counterclockwise direction the cam driver 160 (not shown in FIG. 8 or FIG. 9), which is connected to the ring gear 158, also rotates in the counterclockwise direction. Because there is an equivalent static gear ratio of two-to-one between the sprocket 162 and gears 156, 152, and 158, and the sprocket 122, it follows that a one hundred and eighty degree clockwise rotation of the sprocket 122 results in a ninety degree counterclockwise rotation of the ring gear 158 and the cam driver 160. It is to be noted that because the ring gear 158 and cam driver 160 undergo (in the counterclockwise direction) only half the (clockwise) angular rotation that the pedal 126 and sprocket 122 undergo, the ring gear 158 and cam driver 160 arrive at the middle of a pedal drive cycle after rotating only forty-five degrees in the counterclockwise direction. Similarly, the ring gear 158 and cam driver 160 arrive at the end of a pedal drive cycle after rotating a total of ninety degrees in the counterclockwise direction.

With reference to FIG. 8 a and FIG. 8b, the relative positions of the components of the second preferred embodiment of apparatus, at a beginning of a pedal drive cycle, are shown by dots on each component, and are such that each of the driver cam rollers 147 is positioned on a circular portion of the outer surface of the driver cam 148. Each of the driver cam rollers 147 is denoted either by a numeral "1" or a numeral "2". The driver cam rollers 147 are one hundred and eighty degrees apart from one another, and each is forty-five degrees away from a nearby slot, or recess, in the outer surface of the driver cam 148. Two of the shoulders in the inner surface of the cam driver 160 are in contact with the two driver cam rollers 147. The pin 143a projecting into the interior of the slot 151a, abuts against a right-hand end of the slot 151a, while the pin 143b projecting into the interior of the slot 151b, abuts against a left-hand end of the slot 151b.

With reference to FIG. 8b, at the beginning of the pedal drive cycle the four clutch cam rollers 144 are positioned in their respective recesses in the outer surface of the clutch cam 142. The clutch cam rollers 144, each of which is denoted by a numeral "3", "4", "5", or "6", ride against their tension springs 145 and are relatively free from the inner surface of the hub 112.

With reference now to FIGS. 9a and 9b, as the cam driver 160 rotates in the counterclockwise direction, two of the four shoulders in the inner surface of the cam driver 160 engage the driver cam rollers 147. The driver cam rollers 147 are thus urged to roll over the surface of the driver cam 148 in a counterclockwise direction. The counterclockwise rotation of the driver cam rollers 147 produces an identical counterclockwise rotation of the tubular member 146 which carries the driver cam rollers 147. Because the tubular member 146 is connected to the clutch cam 142, the counterclockwise rotation of the tubular member 146 results in the clutch cam 142 also being rotated in the counterclockwise direction. The counterclockwise rotation of the clutch cam 142 results in the pins 143a and 143b being rotated in the counterclockwise direction through the interiors of the slots 151a and 151b, respectively. The counterclockwise rotation of the clutch cam 142 also results in a tensioning of the spring 134.

The counterclockwise rotation of the driver cam rollers 147 proceeds until each of the rollers falls into a recess in the outer surface of the driver cam 148. Upon falling into these recesses, the driver cam rollers 147 become disengaged from the cam driver 160. The disengagement of the driver cam rollers 147 from the cam driver 160 occurs after the driver cam rollers 147 have rolled forty-five degrees in the counterclockwise direction, over the outer surface of the driver cam 148. The moment of disengagement of the driver cam rollers 147 from the cam driver 160 is the middle of a pedal drive cycle.

With reference to FIGS. 10a, 10b, after the driver cam rollers 147 have become disengaged from the cam driver 160, the clutch cam 142 (shown in FIG. 10b) is rotated in the clockwise direction under the influence of the tensioned spring 134. The clockwise rotation of the clutch cam 142 results in the pins 143a and 143b being rotated in the clockwise direction through the interiors of the slots 151a and 151b, respectively. As the clutch cam 142 rotates in the clockwise direction, the clutch cam rollers 144, carried in recesses in the outer surface of the clutch cam 142, roll from the wider to the narrower portions of their recesses and frictionally engage the inner surface of the hub 112, causing the hub to rotate in the clockwise direction.

The clockwise rotation of the clutch cam 142 results in a corresponding clockwise rotation of the tubular member 146, which tubular member is connected to the clutch cam 142. The clockwise rotation of the tubular member 146 in turn results in a corresponding clockwise rotation of the driver cam rollers 147 over the outer surface of the driver cam 148, which rollers are carried in longitudinal recesses in the tubular member 146. After the driver cam rollers 147 have rotated forty-five degrees in the clockwise direction over the outer surface of the driver cam 148, the driver cam rollers 147 come into contact with the two shoulders in the inner surface of the cam driver 160 which had not previously engaged the driver cam rollers 147. It is to be noted that the cam driver 160 continues to rotate in the counterclockwise direction throughout the entire pedal drive cycle. An end of the pedal drive cycle occurs at the instant that the two driver cam rollers come into contact with the two shoulders in the inner surface of the cam driver 160, which shoulders had not previously engaged the driver cam rollers 147. This occurs after the cam driver has rotated a total of ninety degrees in the counterclockwise direction.

At the end of the pedal drive cycle, the spring 134 has rotated the clutch cam 142 through forty-five degrees in a clockwise direction. During this clockwise rotation of the clutch cam 142 the spring 134 gives up all of the energy stored in the spring during the interval between the beginning of the pedal drive cycle and the middle of the pedal drive cycle.

In summary, and with reference to FIGS. 6, 7, and 9, the operation of the second embodiment is such that a clockwise rotation of one of the pedals 126 produces a clockwise rotation of the sprockets 122 and 162. As the sprocket 162 rotates in the clockwise direction the sprocket mount 154, which carries the sprocket 162, also rotates in the clockwise direction. The sun gear 156, which is mounted on the tubular member 155 connected to the sprocket mount 154, also rotates in the clockwise direction (as viewed in FIG. 9). But, as shown in FIG. 9, a clockwise rotation of the sun gear 156, whose teeth mesh with those of the planet gears 152, produces a counterclockwise rotation of the planet gears 152. The planet gears 152, which are rotated in the counterclockwise direction and which have teeth which mesh with those of the ring gear 158, produce a counterclockwise rotation of the ring gear 158. Thus, the reversing mechanism has transformed a clockwise rotational motion of the pedals 126 into a counterclockwise rotation of the ring gear 158.

With reference to FIGS. 7 and 9a, a counterclockwise rotation of the ring gear 158 (shown in FIG. 7) produces an identical counterclockwise rotation of the cam driver 160, (as viewed in FIG. 9a), which cam driver is connected to the ring gear 158. As shown in FIG. 9a, as the cam driver 160 rotates in the counterclockwise direction, two of the four internal shoulders in the inner surface of the cam driver 160 engage the two driver cam rollers 147, which rollers roll over the surface of the driver cam 148, and which rollers are carried by the tubular member 146. Thus, as the rollers 147 are forced to roll in the counterclockwise direction over the surface of the driver cam 148, the tubular member 146 is thereby also forced to rotate in the counterclockwise direction. Because the tubular member 146 is connected to the clutch cam 142 (not shown in FIG. 9a), and because a right-hand end of the spring 134 is mounted in a semi-circular notch in the clutch cam 142, the clutch cam 142 is rotated in the counterclockwise direction and the spring 134 is thereby tensioned.

When the driver cam rollers 147 fall into the recesses in the outer surface of the driver cam 148, the tubular member 146, as well as the clutch cam 142 to which the tubular member 146 is connected, is released from the cam driver 160. Thus, the clutch cam 142 may now be rotated in the clockwise direction under the influence of the tensioned spring 134 and the clutch cam rollers 144 can frictionally engage the inner surface of the hub 112.

With reference to FIG. 15, a rider of the bicycle may adjust the transmission mechanism 130 to suit his own power speed characteristics by precompressing the spring 134. This precompression may be accomplished by rotating the main spring tension adjustment gear 138 in a counterclockwise direction. The main spring tension adjustment gear 138 is rigidly mounted on the bearing and main spring mount 136, which spring mount includes a right-hand portion (as seen from FIG. 7) having a semi-circular notch. A left-hand portion of the spring 134 is embedded in this semi-circular notch.

The rotation of the main spring tension adjustment gear 138 may be accomplished by turning a worm gear 139, whose teeth mesh with the teeth of the main spring tension adjustment gear 138. The spring 134 may be precompressed by rotating the main spring tension adjustment gear 138 in a counterclockwise direction, while the spring 134 may be relaxed by rotating the main spring tension adjustment gear 138 in a clockwise direction. The main spring tension adjustment gear 138 may be rotated in a clockwise or counterclockwise direction by rotating the worm gear 139 in either a clockwise or counterclockwise direction.

It is to be noted that the pins 143a and 143b projecting from the right-hand end of the clutch cam 142 into the interiors of the circular slots 151a and 151b, respectively, in the left-hand end of the driver cam 148, permit the clutch cam 142 to rotate in a counterclockwise direction at the beginning of a pedal drive cycle, but prevent the clutch cam 142 from rotating in a clockwise direction at the beginning of a pedal drive cycle. This feature permits a precompression of the spring 134 to be maintained in the absence of any rotation of the pedals 126. That is, when the spring 134 is precompressed by rotating the main spring tension adjustment gear 138, the resulting tension in the spring 134 urges the clutch cam 142 to rotate in the clockwise direction (as viewed in FIG. 8b). If the clutch cam 142 were allowed to rotate in the clockwise direction at the beginning of the pedal drive cycle the tensioned spring 134 could relax and thus no precompression of the spring 134 could be maintained. However, the pins 143a and 143b and the slots 151a and 151b prevent the clutch cam 142 from rotating in the clockwise direction at the beginning of a pedal drive cycle, thus permitting a precompression of the spring 134 to be maintained in the absence of any rotation of the pedals 126.

Figure 11:
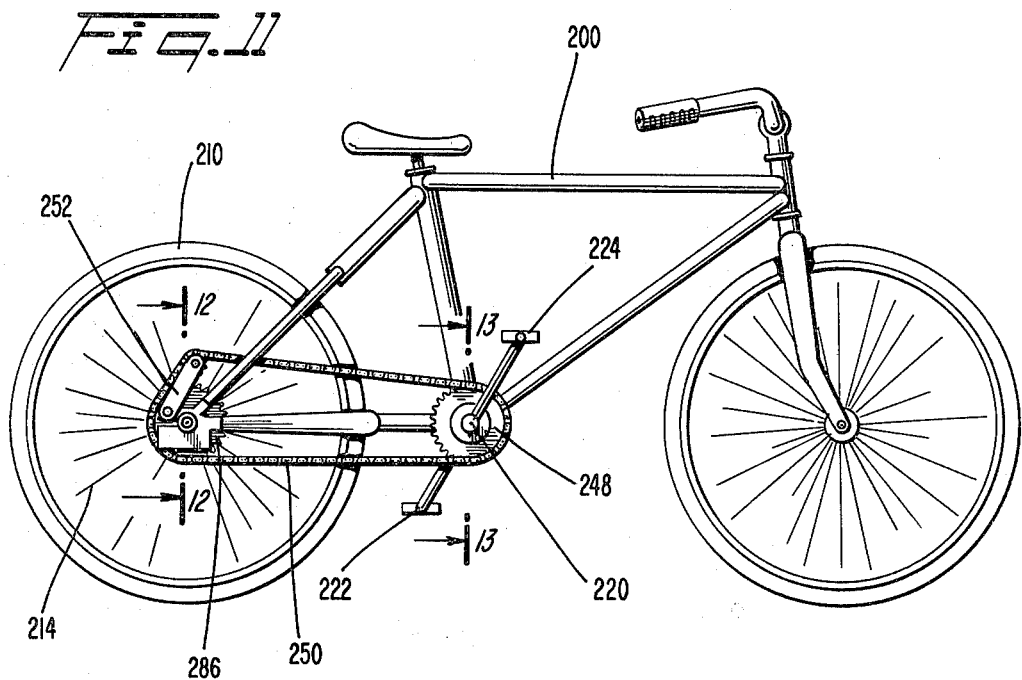
FIG. 11 is a front view of a bicycle which includes a third preferred embodiment of a transmission apparatus, according to the present invention, for transmitting power from a rider of a bicycle to a ground engaging wheel of the bicycle.
Figure 12:
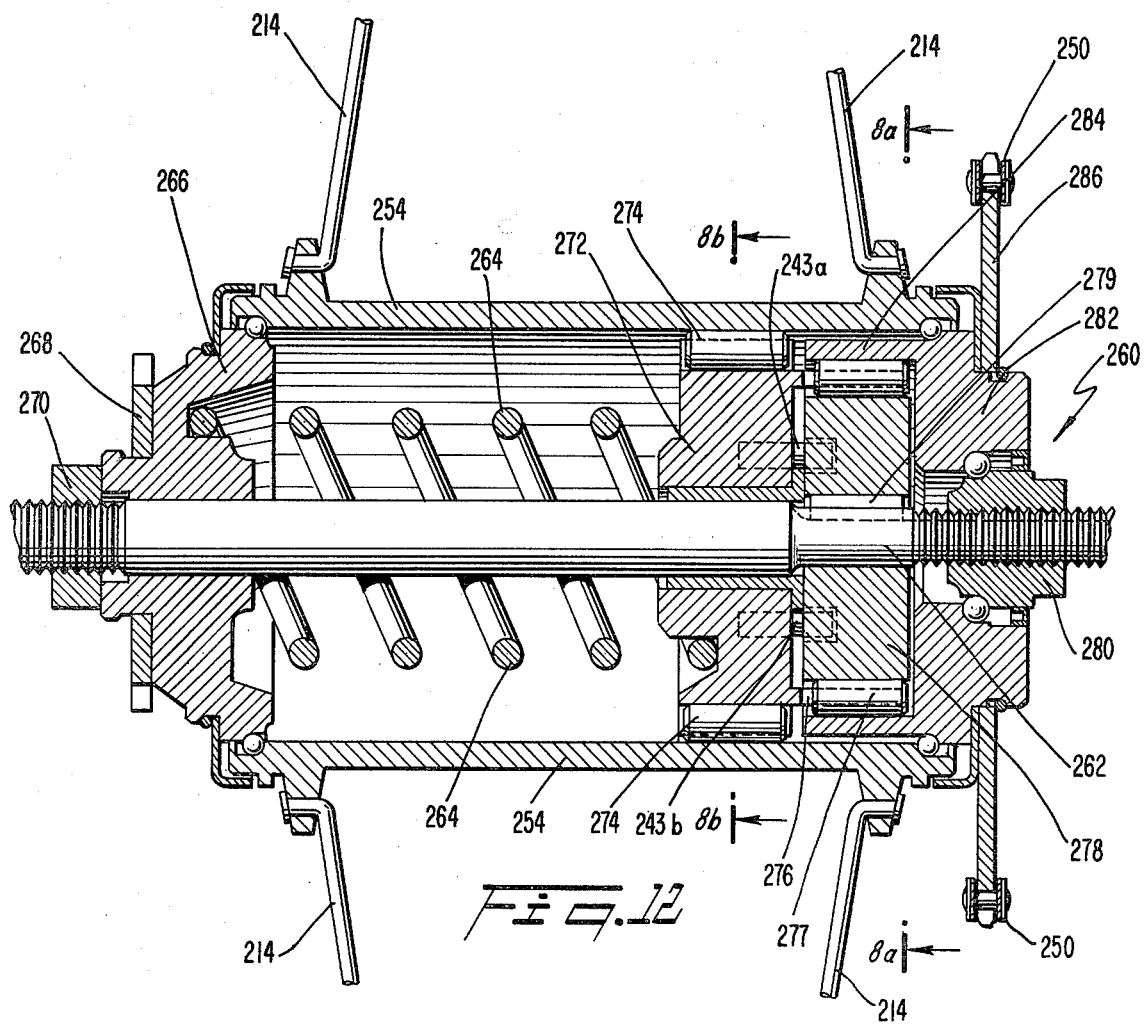
FIG. 12 is a transverse, cross-sectional view of the third preferred embodiment of apparatus shown in FIG. 11, taken on the line 12—12.

With reference to FIGS. 11–13, a third embodiment of apparatus for transmitting power from a rider of a bicycle to the bicycle, according to the present invention, is similar to the second embodiment but differs in that a motion reversing mechanism 230 is housed in a pedal hub 226 (shown in FIG. 13) near the front of the bicycle, while an engaging mechanism is housed in a hub 254 (shown in FIG. 12) of a ground engaging wheel 210 near the rear of the bicycle. The third embodiment, like the second embodiment, includes a bicycle frame 200, and a ground engaging wheel 210. The ground engaging wheel 210 includes a hub 254 and a plurality of wheel spokes 214.

With reference to FIGS. 11 and 13, a shaft 220 is rotatably connected to the frame 200. Cranks 222 are rigidly connected to threaded portions of the shaft 220, and pedals 224 are connected to the cranks 222. The pedals 224 may be selectively, drivingly engaged by the rider of the bicycle.

With reference to FIG. 13, a pedal hub 226 encircles the shaft 220 and is rigidly connected to the frame 200. The pedal hub 226 houses the motion reversing mechanism 230, as well as a first sprocket 248.

With reference to FIGS. 11 and 12, a transmission chain 250 links the first sprocket 248 to a second sprocket 286 in a mechanism 260 housed in the hub 254 of the ground engaging wheel 210. The mechanism 260 includes an engaging mechanism for periodically compressing an elastic element, as well as a one-way clutch. A spring loaded idler gear 252 maintains the transmission chain 250 under tension to prevent "flyback" when the elastic element is released after having been compressed.

With reference to FIGS. 13 and 14, the motion reversing mechanism 230 includes a hub mount 231 which encircles a left-hand, threaded portion of the shaft 220. The hub mount 231 is mounted on the shaft 220 adjacent to, but to the right of, one of the cranks 222.

An annular member 232, which is to the right of, and spaced apart from, the hub mount 231, encircles the shaft 220 and is rigidly connected to the pedal hub 226 by a screw 234. The annular member 232 is hereinafter referred to as the planet gear mount. The planet gear mount 232 includes three equi-angularly spaced longitudinal apertures. Each of the longitudinal apertures contains a pin 236 which projects to the right from the planet gear mount 232. Rotatably mounted on each of the pins 236 is a planet gear 238.

A sun gear 240 is rigidly mounted on the shaft 220 adjacent to, and to the right of, the planet gear mount 232. The teeth of the sun gear 240 mesh with the teeth of the planet gears 238.

Rigidly mounted on a right-hand, threaded portion of the shaft 220 is a nut 242. Rotatably mounted on the nut 242 is a first sprocket mount 244. Connected to the sprocket mount 244, and projecting to the left from the sprocket mount 244, is a ring gear 246. The teeth of the planet gears 238 mesh with the teeth of the ring gear 246.

With reference to FIGS. 11 and 13, the first sprocket 248 is rigidly mounted on the sprocket mount 244. The transmission chain 250 encircles the first sprocket 248 and links the first sprocket 248 to the second sprocket 286 in the mechanism 260 housed in the hub 254 of the ground engaging wheel 210.

With reference to FIG. 12, the mechanism 260 includes an axle 262 of the wheel 210, which axle is rigid with respect to the frame 200. Encircling the axle 262 is a cylindrical spring 264. Mounted on a left-hand portion of the axle 262 is a bearing and main spring mount 266. A right-hand portion of the bearing and spring mount 266 includes a semi-circular notch. As was the case with the second embodiment, a left-hand portion of the cylindrical spring 264 is embedded in this semi-circular notch. Rigidly mounted on the bearing and main spring mount 266 is a main spring tension adjustment gear 268. Mounted on an extreme, left-hand, threaded portion of the axle 262 is a nut 270. The nut 270 prevents the bearing and main spring mount 266 from undergoing a leftward, longitudinal motion.

Rotatably mounted on a right-hand portion of the axle 262 is a cam 272. This cam 272 is hereinafter referred to as the clutch cam. The clutch cam 272 includes a left-hand end which contains a semi-circular notch. As with the second embodiment, a righthand portion of the cylindrical spring 264 is mounted in this semi-circular notch.

The clutch cam 272 includes a substantially cylindrical outer surface. This outer surface includes four equi-angularly spaced notches, or recesses. Each of these notches, or recesses, contains a roller 274. The rollers 274 are hereinafter referred to as the clutch cam rollers. The clutch cam rollers 274 may frictionally engage an inner surface of the hub 254.

Projecting from a right-hand end of the clutch cam 272, and connected to the clutch cam 272, is a tubular member 276. The tubular member 276 contains two longitudinal recesses which are one hundred and eighty degrees apart from one another. Each of the longitudinal recesses contains a roller 277. The two rollers 277 are hereinafter referred to as the driver cam rollers.

Rigidly mounted on the axle 262, adjacent to and to the right of the clutch cam 272, is a cam 278. The cam 278 is hereinafter referred to as the driver cam. The driver cam 278 is rigidly connected to the axle 262 by a key 279. The driver cam 278 includes an outer surface which is substantially cylindrical in shape. The outer surface of the driver cam 278 includes two notches, or recesses, which are spaced apart from one another by one hundred and eighty degrees. The driver cam rollers 277, carried by the tubular member 276, are in contact with the outer surface of the driver cam 278.

Rigidly mounted on a right-hand, threaded portion of the axle 262 is a nut 280. Rotatably mounted on the nut 280 is a second sprocket mount 282. Connected to the second sprocket mount 282, and projecting to the left from the second sprocket mount 282, is a tubular member 284. The tubular member 284 is hereinafter referred to as the cam driver. The cam driver 284 includes an inner surface having four equi-angularly spaced shoulders. These four shoulders may engage the driver cam rollers 277.

The sprocket 286 is rigidly mounted on the second sprocket mount 282. The second sprocket 286 is linked to the first sprocket 248 by the transmission chain 250, which transmission chain encircles both sprockets.

The axle 262 is rigidly connected to the frame 200 of the bicycle by conventional means (not shown).

The third embodiment of apparatus, like the second embodiment, also includes a mechanism for pretensioning the spring 264. This mechanism includes a main spring tension adjustment gear 268 mounted on the bearing and main spring mount 266. A worm gear whose teeth mesh with those of the spring tension adjustment gear 268, like the worm gear in FIG. 15, may be used to rotate the gear 268 in a clockwise or counterclockwise direction in order to relax or to pretension the spring 264.

The third embodiment, like the second embodiment, also includes two pins 243a and 243b connected to a right-hand end of the clutch cam 272, and two circular slots in a left-hand end of the driver cam 278. Each of the slots subtends an angle of forty-five degrees, and each of the pins projects into an interior of one of the slots. The slots permit the pins and the clutch cam 272 to rotate in a counterclockwise direction (as viewed from the right in FIG. 12) at the beginning of a pedal drive cycle, but prevent the clutch cam 272 from rotating in a clockwise direction at the beginning of a pedal drive cycle. Thus, a precompression of the spring 264 may be maintained in the absence of any rotation of the pedals 224.

With reference to FIGS. 11–13, the third embodiment of apparatus described above operates in a fashion quite similar to that of the second embodiment. The one major difference in the operations of the second and third embodiments is that, with respect to the third embodiment, a clockwise motion of the pedals 224 is transformed into a counterclockwise motion of the sprocket 248 by the motion reversing mechanism 230 housed in the pedal hub 226. The mechanism 260, housed in the hub 254 of the ground engaging wheel 210, then produces a periodic tensioning of the cylindrical spring 264, and a periodic transfer of the energy periodically stored in the spring 264 to the hub 254.

It is to be noted that the dimensions of the sprockets 286 and 248 and gears 240, 238, and 246, are such that a one hundred and eighty degree clockwise rotation of one of the pedals 224 and the shaft 220 results in a ninety degree counterclockwise rotation of the sprocket 286.

ADVANTAGES OF THE PRESENT INVENTION

The transmission apparatus of the present invention has a number of advantages. One such advantage is due to the use of a spring for storing energy because a spring can accept power from a rider of a bicycle at one speed while efficiently delivering power to a ground engaging wheel of the bicycle over a broad range of speeds. That is, as the rider rotates the pedals of the bicycle at a first speed, the cylindrical spring becomes linked to the pedals, and receives and stores energy from the rotating pedals, during a first portion of the pedal drive cycle. During a second portion of the pedal drive cycle the cylindrical spring becomes disengaged from the pedals and engages the ground engaging wheel of the bicycle through the free-wheeling clutch. It is during this second portion of the pedal drive cycle that the cylindrical spring relaxes and transfers its stored energy to the ground engaging wheel, which wheel may be rotating at a second speed that may be quite different from the first speed of the pedals.

Another advantage of the present invention is that a rider of a bicycle is decoupled from a load on the bicycle. This is due to the fact that the rider is never directly linked to the ground engaging wheel of the bicycle, but is only indirectly linked through the energy-storing spring. Thus, as the terrain becomes steeper and the load on the bicycle correspondingly increases, the rider does not feel this increase in the load. The rider may continue to deliver whatever constant power he wishes to deliver to the bicycle, and the bicycle will continue to move in a forward direction. However, the speed of the bicycle will decrease as the terrain becomes steeper, and eventually the terrain may become so steep that the constant power delivered by the rider is no longer sufficient to propel the bicycle in the forward direction.

Yet a further advantage of the present invention is that it is, in a sense, an automatic transmission. That is, with the present invention, a rider of a bicycle producing an average power need not shift through a plurality of gear combinations, as the speed of the bicycle changes, to transmit all of this average power to the bicycle, as is necessary with a conventional multi-geared bicycle. This is explained in more detail below.

A qualitative plot of a torque delivered to a ground engaging wheel of a bicycle incorporating the present invention, as a function of time during a pedal drive cycle, when a rider of the bicycle is producing power at a constant pedal speed, is provided in FIG. 17. As shown in FIG. 17, if a rider of a bicycle produces power at a constant pedal speed, then the torque delivered to the ground engaging wheel of the bicycle by the elastic element of the present invention is zero during a first portion of the pedal drive cycle, increases to a maximum at the beginning of a second portion of the pedal drive cycle, and then decreases from this maximum to zero during the second portion of the pedal drive cycle. During the first portion of the pedal drive cycle the elastic element is being tensioned or cocked, and during the second portion of the pedal drive cycle the elastic element relaxes. An average torque, $\tau$, delivered to the ground engaging wheel during a complete pedal drive cycle is that torque whose amplitude, multiplied by a length in time of a complete pedal drive cycle, is equal to an area under the torque versus time curve of the second portion of the pedal drive cycle.

A qualitative plot of the average torque delivered to a ground engaging wheel of a bicycle incorporating the present invention, when a rider of the bicycle is producing power at a constant pedal speed, is provided in FIG. 18. As shown in FIG. 18, if the rider of the bicycle produces power at a constant pedal speed then the average torque, $\tau$, delivered by the present invention to the ground engaging wheel of a bicycle, decreases from a maximum, called the stall torque, $\tau_s$, when a speed of the bicycle, $v_b$, is zero, toward zero as the speed of the bicycle increases.

If the average power, P, delivered by the present invention to the ground engaging wheel of a bicycle ridden by a rider producing power at a constant pedal speed is defined to be the multiple of the average torque, $\tau$, and the bicycle speed, $v_b$, i.e. $P = \tau \times v_b$, then the average power delivered by the present invention to the ground engaging wheel of the bicycle is as shown in FIG. 19. That is, the average power quickly increases from zero, at zero bicycle speed, to a constant value above a minimum bicycle speed, $v_{bmin}$. This constant value is just the average constant power produced by the rider of the bicycle. Thus, above the minimum bicycle speed, $v_{bmin}$, the present invention acts like an ideal transmission, i.e., it transmits to the bicycle virtually all the power produced by the rider. Above a certain maximum bicycle speed, $v_{bmax}$, which is typically many times the size of the minimum bicycle speed, $v_{bmin}$, however, the present invention no longer acts like an ideal transmission.

A qualitative plot of a power delivered to a ground engaging wheel of a bicycle as a function of bicycle speed, by each individual gear combination of a multi-geared conventional bicycle transmission, is provided in FIG. 20. As shown in this figure, the power produced by a rider of the bicycle, substantially all of which power is delivered by each gear combination of the bicycle transmission to the bicycle, varies sharply with bicycle speed. That is, each individual gear combination transmits to the bicycle substantially all of the maximum power delivered by a rider of the bicycle, only over a very narrow bicycle speed range. Thus, as the speed of the bicycle increases beyond the narrow speed range where a particular gear combination can transmit to the bicycle substantially all of the maximum power delivered by the rider, the rider must necessarily shift to another gear combination which can transmit to the bicycle substantially all of the maximum power delivered by the rider. In contrast, because the present invention transmits to the bicycle virtually all of a constant power delivered by the rider over a very wide bicycle speed range, and thereby avoids the need for shifting through a series of gear combinations, it may be termed an "automatic transmission".

It is to be noted that the present invention acts like an ideal transmission only if there is sufficient time for the energy-storing spring to be cocked and completely uncocked. That is, there must be sufficient time for the spring to fully relax before being cocked again. Below the minimum bicycle speed, $v_{bmin}$, the ground engaging wheel is rotating so slowly, i.e. the spring is being uncocked so slowly, that the spring will be cocked again before it has completely relaxed. Above the maximum bicycle speed, $v_{bmax}$, an angular inertia of the spring prevents the spring from relaxing quickly enough to give up all of its stored energy to the very rapidly rotating ground engaging wheel of the bicycle. Depending on a number of factors $v_{bmin}$ may be less than three miles per hour, while $v_{bmax}$ may be in excess of three hundred miles per hour. Thus, the present invention may act like an ideal transmission for a speed ratio, i.e., a ratio of $v_{bmax}$ to $v_{bmin}$, of about one hundred.

Yet another advantage of the present invention is that the stall torque, $\tau_s$, delivered to a bicycle by the present invention is much higher than the stall torque delivered by a transmission of a conventional bicycle. In the conventional transmission, the stall torque is proportional to a multiple of three factors: the rider's weight; the ratio of the pedal radius to the radius of the ground engaging wheel; and the static gear ratio. That is, $$\tau_s \propto W_r(R_p/R_w)G_r$$

where: $W_r$ is the rider's weight; $R_p$ is the pedal radius; $R_w$ is the radius of the ground engaging wheel; and $G_r$ is the static gear ratio. For a conventional bicycle a low-speed static gear ratio is typically one-to-two. In the preferred embodiments of the present invention, the static gear ratio or the equivalent static gear ratio is two-to-one. Thus, the preferred embodiments of the present invention are able to deliver a stall torque which is four times greater than the stall torque that a conventional transmission of a conventional bicycle is able to deliver.

The stall torque is the largest torque which can be delivered to a bicycle. The magnitude of the stall torque is important because it determines, in effect, the steepest terrain which can be surmounted by the bicycle. That is, as the stall torque increases, the force that propels the bicycle at zero speed increases. As this force increases, the steepness of the terrain which may be surmounted by a bicycle increases. Thus, because the present invention delivers a much greater stall torque to a bicycle than a conventional transmission, the present invention enables a rider-propelled bicycle to ride over more steeply inclined terrain than is possible with a conventional bicycle.

The large magnitude of the stall torque produced by the present invention is also advantageous because it implies that the acceleration which a bicycle will experience at low speeds is relatively high. The greater this acceleration the more quickly the bicycle will achieve a speed at which the present invention acts as an ideal transmission.

It is to be noted that a conventional, multigeared bicycle may be modified to include a two-to-one gear combination at low speeds in order to increase the deliverable stall torque. However, the advantage gained by such a modification is offset by the relatively poor power-bicycle speed characteristics of the different gear combinations of a conventional bicycle, including the two-to-one gear combination, as shown in FIG. 20. Thus, even with the inclusion of a low-speed two-to-one gear combination, the rider of a conventional bicycle would have to start shifting gears almost immediately in order to transmit effectively constant power to the bicycle.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. Apparatus for transmitting power from a rotating driving member to a rotating driven member, comprising:
   a rotatable driving member;
   a rotatable driven member;
   energy storage means for storing mechanical energy; and
   transmission means for alternately and repeatedly first linking said driving member to said energy storage means and then linking said energy storage means to said rotatable driven member to transmit substantially all the power from said rotatable driving member to said rotatable driven member while said driving member and said driven member rotate, said driving member being decoupled from said energy storage means while said energy storage means is linked to said rotatable driven member and said rotatable driven member being decoupled from said energy storage means while said energy storage means is linked to said driving member.

2. Apparatus in accordance with claim 1 wherein said energy storage means includes:
   a shaft, said shaft being fixed with respect to said apparatus; and
   a cylindrical spring encompassing said shaft, a first end of which cylindrical spring is fixedly connected to said shaft.

3. Apparatus in accordance with claim 2, wherein said transmission means includes:
   linking means for intermittently linking said cylindrical spring to said rotatable driving member, whereby said spring may be intermittently tensioned to intermittently transfer energy to said spring; and
   clutch means for intermittently linking said cylindrical spring to said rotatable driven member, energy stored in the spring being intermittently transmitted to the rotatable driven member, said clutch means operating alternatingly with said linking means.

4. Apparatus in accordance with claim 3, wherein said linking means includes engaging means for intermittently and operatively engaging said spring.

5. Apparatus in accordance with claim 4 wherein said linking means further includes reversing means, linking said engaging means to said rotatable driving member, for rotating said engaging means in a second direction opposed to a first direction of rotation of said rotatable driving member, whereby said spring may be intermittently tensioned.

6. A wheeled vehicle having a transmission mechanism, comprising:
a rotatable driving member;
a frame of the vehicle;
an axle which is rigidly connected to said frame;
a ground engaging wheel of the vehicle which is rotatably mounted with respect to said axle;
means for mounting the rotatable driving member on the frame of the vehicle;
a cylindrical spring encompassing said axle, a first end of which cylindrical spring is connected to said axle; and
transmission means for alternately and repeatedly first linking said driving member to said cylindrical spring and then linking said cylindrical spring to said ground engaging wheel to transmit substantially all the power from said driving member through said spring to said ground engaging wheel while said driving member and said driven member rotate.

7. Apparatus in accordance with claim 6, wherein said transmission means includes:
clutch means for intermittently linking said cylindrical spring to the ground engaging wheel and for urging said ground engaging wheel to rotate, one portion of said clutch means being connected to a second end of the cylindrical spring;
engaging means for intermittently engaging said one portion of said clutch means; and
reversing means, linking said engaging means to said rotatable driving member, for rotating said one portion of said clutch means in a second direction opposed to a first direction or rotation of said rotatable driving member.

8. Apparatus in accordance with claim 7, wherein said clutch means includes:
a pawl mount which is rotatably mounted on said axle, which pawl mount includes at least one pivotable pawl, and which pawl mount is connected to a second end of the cylindrical spring; and
a ratchet wheel which is connected to said ground engaging wheel.

9. Apparatus in accordance with claim 8, wherein said engaging means includes:
a cam which is rigidly mounted on said axle adjacent to the pawl mount;
an outer surface of the cam, which outer surface includes a first portion having at least one concave segment;
a tubular member connected to said pawl mount and extending axially from said pawl mount to encircle said cam, which tubular member includes an inner surface having at least one shoulder;
a driver which is rotatably mounted on said shaft adjacent said cam; and
at least one ball bearing which is connected to said driver and is rotated over the first portion of the outer surface of said cam by said driver, which bearing periodically engages, and is disengaged from, the at least one shoulder in the inner surface of the tubular member as the bearing rotates over the first portion of the outer surface of the cam.

10. Apparatus in accordance with claim 9 wherein said reversing means includes:
a sprocket mounted on said driver; and
a figure-eight chain which connects said sprocket to said driving member.

11. Apparatus in accordance with claim 9 wherein said clutch means further includes:
a second portion of the outer surface of said cam, which second portion includes at least one segment having a radius which decreases from a first relatively large radius to a second relatively small radius;
at least one shoulder defining a juncture between said first radius and said second radius;
at least one ball which is in contact with the second portion of the outer surface of said cam; and
at least one pawl biasing spring which includes a first end which is connected to the at least one pawl, and a second end which is mounted on said ball, which biasing spring urges the at least one pawl to pivot into engagement with the ratchet wheel.

12. Apparatus in accordance with claim 11 wherein said clutch means further includes at least one reset spring, which reset spring includes a first end which is connected to the pawl mount and a second end which is connected to the pawl, said reset spring urging the pawl to pivot out of engagement with said ratchet wheel.

13. Apparatus in accordance with claim 7 wherein said clutch means includes:
a clutch cam rotatably mounted on said axle, which clutch cam includes an end having a semi-circular notch, a second end of said spring arranged within said semi-circular notch;
an outer surface of said clutch cam, which outer surface includes at least one recess; and
at least one roller arranged within the at least one recess, which roller may frictionally engage an inner surface of a hub of said ground engaging wheel.

14. Apparatus in accordance with claim 13 wherein said clutch means further includes at least one spring arranged within the at least one recess, a first end of which spring is connected to said clutch cam and a second end of which spring is in contact with said roller.

15. Apparatus in accordance with claim 13, wherein said engaging means includes:
a driver cam rigidly mounted on said axle adjacent said clutch cam;
an outer surface of said driver cam, which outer surface includes at least one recess;
a tubular member projecting from said clutch cam, which tubular member encircles said driver cam, and which tubular member includes a side wall having at least one longitudinal aperture; and
at least one roller, arranged within said longitudinal aperture, which roller is in contact with the outer surface of said driver cam.

16. Apparatus in accordance with claim 15, wherein said reversing means includes:
a sprocket mount rotatably mounted with respect to said axle;
a tubular member which is connected to, and which projects from, said sprocket mount, and which tubular member encircles said axle;
a sun gear having teeth, which sun gear is mounted on said tubular member;
at least one planet gear having teeth which mesh with those of the sun gear, which planet gear is mounted on a pin arranged within, and projecting from, a longitudinal aperture in said driver cam; and a ring gear, rotatably mounted on said sprocket mount, which ring gear includes teeth which mesh with those of the at least one planet gear.

17. Apparatus in accordance with claim 16, wherein said engaging means further includes:
a tubular cam driver which is connected to, and which projects from, said ring gear, and which cam driver encircles said driver cam; and
an inner surface of said cam driver, which inner surface includes at least one shoulder which may engage the at least one roller in contact with the outer surface of said driver cam.

18. Apparatus in accordance with claim 16, wherein said reversing means further includes:
a sprocket mounted on said sprocket mount;
a transmission chain which connects said sprocket to said driving member; and
means for maintaining said transmission chain under tension.

19. Apparatus in accordance with claim 15, wherein said engaging means further includes:
a first sprocket mount rotatably mounted with respect to said axle;
a tubular cam driver connected to, and projecting from, said first sprocket mount, which cam driver encircles said driver cam; and
an inner surface of said tubular cam driver, which inner surface includes at least one shoulder which may engage the at least one roller in contact with the outer surface of said driver cam.

20. Apparatus in accordance with claim 19 wherein said reversing means includes:
a shaft which is rotatably mounted with respect to said frame;
an annular planet gear mount which encircles said shaft and is rigidly mounted with respect to said frame;
a sun gear with teeth, which sun gear is rigidly mounted on said shaft adjacent said planet gear mount;
at least one planet gear having teeth which mesh with those of the sun gear, which planet gear is mounted on a pin arranged within, and projecting from, a longitudinal aperture in said planet gear mount;
a second sprocket mount rotatably mounted with respect to said shaft, adjacent said sun gear; and
a ring gear, connected to, and projecting from said second sprocket mount, which ring gear includes teeth which mesh with those of the at least one planet gear.

21. Apparatus in accordance with claim 20, wherein said reversing means further includes:
a first sprocket mounted on said first sprocket mount;
a second sprocket mounted on said second sprocket mount;
a transmission chain which encircles said first and second sprockets; and
means for maintaining said transmission chain under tension.

22. Apparatus in accordance with claim 6, further comprising means for pretensioning said cylindrical spring.

23. Apparatus in accordance with claim 22, wherein said means for pretensioning said cylindrical spring includes:
a spring mount mounted on said axle, which spring mount includes an end having a semi-circular notch within which the first end of said spring is arranged;
a tension adjustment gear with teeth, which tension adjustment gear is mounted on said spring mount; and
a worm gear having teeth which mesh with those of the tension adjustment gear.

24. Apparatus in accordance with claim 6, wherein said frame is a frame of a bicycle.

25. Apparatus in accordance with claim 24 wherein said rotatable driving member includes:
first and second cranks rotatably connected to the frame of the bicycle; and
first and second pedals connected, respectively, to the first and second cranks, said cranks being rotable with respect to the frame.

26. A bicycle having a transmission, comprising:
a bicycle frame;
a shaft rotatably connected to said frame;
first and second cranks rigidly connected to said shaft;
first and second pedals connected, respectively, to the first and second cranks, which pedals are rotatable with respect to the frame;
an axle rigidly connected to the frame;
a ground engaging wheel of the bicycle rotatably mounted with respect to said axle;
a cylindrical spring which encompasses said axle, a first end of which spring is operatively connected to said axle;
clutch means for intermittently linking said cylindrical spring to said ground engaging wheel and for urging said ground engaging wheel to rotate, one portion of said clutch means being operatively connected to a second end of the cylindrical spring;
engaging means for intermittently engaging said one portion of said clutch means; and
reversing means, linking said engaging means to said pedals, for rotating the one portion of said clutch means in a second direction opposed to a first direction of rotation of said pedals.

27. A method for transmitting power from a rotatable driving member to a rotatable driven member, comprising the steps of:
rotating the driving member; and
alternately and repeatedly first linking the rotatable driving member to an energy storage means and then linking the energy storage means to the rotatable driven member in order to successively and repeatedly transfer energy from said driving member to said energy storage means and from said energy storage means to said rotatable driven member, said driving member being decoupled from said energy storage means while said energy storage means is linked to said rotatable driven member and said rotatable driven member being decoupled from said energy storage means while said energy storage means is linked to said driving member.

28. A method for transmitting power from a rotatable driving member to a ground engaging wheel of a wheeled vehicle, comprising the steps of:
rotating the driving member;
selectively linking a second end of a cylindrical spring, which spring encircles an axle of the vehicle and a first end of which spring is connected to the axle of the vehicle, to the driving member to selectively tension said spring;

selectively linking the second end of said spring to the ground engaging wheel in order to transmit energy stored in the spring to the wheel; and alternately repeating said selective linking to drive the wheel, said driving member being decoupled from said energy storage means while said energy storage means is linked to said rotatable driven member and said rotatable driven member being decoupled from said energy storage means while said energy storage means is linked to said driving member.

29. The method of claim 28 wherein the step of selectively linking the cylindrical spring to the driving member includes the steps of:

rotating a driver, which driver is rotatably mounted on said axle and linked to said driving member, in a second direction opposed to a first direction of rotation of said driving member;

rotating at least one ball bearing in the second direction of rotation over a surface of a cam, which ball bearing is connected to said driver and which cam is rigidly mounted on said axle;

periodically bringing the at least one ball bearing moving over the surface of the cam into engagement with a shoulder in an inner surface of a tubular member projecting from a pawl mount, which pawl mount is rotatably mounted on said axle and which pawl mount is connected to the second end of the spring; and periodically rotating the pawl mount in the second direction.

30. The method of claim 29 wherein the step of selectively linking the second end of the cylindrical spring to the ground engaging wheel includes the steps of:

rotating the pawl mount, which pawl mount includes at least one pivotable pawl, in the first direction by allowing the cylindrical spring to relax;

moving a pawl biasing spring over the surface of the cam, which biasing spring includes a first end which is connected to the pawl and a second end which is mounted on a ball which rolls over the surface of the cam; and selectively urging the at least one pawl into engagement with a ratchet wheel, which ratchet wheel is connected to the ground engaging wheel, as said pawl mount is rotated in the first direction.

31. The method of claim 29 wherein the step of selectively linking the cylindrical spring to the driving member includes the steps of:

rotating a sprocket mount, which sprocket mount is rotatably mounted with respect to said axle and linked to said driving member, in a first direction of rotation;

simultaneously rotating a sun gear having teeth, which sun gear is mounted on a tubular member connected to said sprocket mount, in said first direction;

simultaneously rotating at least one planet gear, which planet gear has teeth which mesh with those of the sun gear, and which plant gear is mounted on a pin arranged within, and projecting from, a longitudinal aperture in a driver cam mounted on said axle, in a second direction opposed to said first direction;

simultaneously rotating a ring gear, which ring gear has teeth which mesh with those of the at least one planet gear, and which ring gear is rotatably mounted on said sprocket mount, in said second direction;

simultaneously rotating a cam driver, which cam driver has an inner surface with at least one shoulder, and which cam driver is connected to said ring gear and encircles the driver cam, in the second direction of rotation over an outer surface of the driver cam;

periodically bringing the at least one shoulder of the cam driver into engagement with an at least one roller, which roller is in contact with the outer surface of the driver cam, and which roller is connected to a clutch cam rotatably mounted on said axle; and periodically rotating the clutch cam, which is connected to a second end of the spring, in the second direction.

32. The method of claim 28 wherein the step of selectively linking the cylindrical spring to the driving member includes the steps of:

rotating a shaft, which shaft is rotatably mounted with respect to a frame of the vehicle, in a first direction;

simultaneously rotating a sun gear, mounted on said shaft, in said first direction;

simultaneously rotating at least one planet gear, which planet gear has teeth which mesh with those of the sun gear, and which planet gear is mounted on a pin arranged within, and projecting from, a longitudinal aperture in a planet gear mount which encircles said shaft and is rigid with respect to said vehicle, in a second direction opposed to said first direction;

simultaneously rotating a ring gear, which ring gear has teeth which mesh with those of the at least one planet gear, and which ring gear is connected to a first sprocket mount rotatably mounted with respect to said shaft, in the second direction; and simultaneously rotating said sprocket mount in said second direction.

33. The method of claim 32 wherein the step of selectively linking the cylindrical spring to the driving member further includes the steps of:

rotating a second sprocket mount, which second sprocket mount is rotatably mounted with respect to said axle and linked to said first sprocket mount, in said second direction;

simultaneously rotating a cam driver, which cam driver has an inner surface with at least one shoulder, and which cam driver is connected to said second sprocket mount and encircles a driver cam mounted on said axle, in the second direction of rotation over an outer surface of the driver cam;

periodically bringing the at least one shoulder of the cam driver into engagement with an at least one roller, which roller is in contact with the outer surface of the driver cam, and which roller is connected to a clutch cam rotatably mounted on said axle; and periodically rotating the clutch cam, which is connected to a second end of the spring, in the second direction.

34. The method of claim 30 or claim 33 wherein the step of selectively linking the second end of the cylindrical spring to the wheel includes the steps of:

rotating the clutch cam, which clutch cam includes an outer surface having at least one recess with a roller arranged within said recess, in the first direction by allowing the cylindrical spring to relax;

bringing the roller arranged within the recess in the outer surface of the clutch cam into frictional engagement with an inner surface of a hub of the ground engaging wheel; and rotating the at least one roller connected to the clutch cam and in contact with the outer surface of the driver cam, in the first direction over the outer surface of the driver cam.

* * * * *